United States Patent
Jaaskelainen et al.

(10) Patent No.: US 12,404,767 B2
(45) Date of Patent: Sep. 2, 2025

(54) DATA DRIVEN IN-SITU INJECTION AND PRODUCTION FLOW MONITORING

(71) Applicant: HALLIBURTON ENERGY SERVICES, INC., Houston, TX (US)

(72) Inventors: Mikko K. Jaaskelainen, Houston, TX (US); Shahab Jamali Ghare Tape, Houston, TX (US); Kashyap Navinchand Choksey, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 55 days.

(21) Appl. No.: 17/350,480

(22) Filed: Jun. 17, 2021

(65) Prior Publication Data
US 2022/0403734 A1 Dec. 22, 2022

(51) Int. Cl.
| | |
|---|---|
| *E21B 47/113* | (2012.01) |
| *E21B 43/12* | (2006.01) |
| *E21B 47/135* | (2012.01) |
| *H04B 10/25* | (2013.01) |
| *H04Q 9/00* | (2006.01) |

(52) U.S. Cl.
CPC .......... *E21B 47/114* (2020.05); *E21B 43/12* (2013.01); *E21B 47/135* (2020.05); *H04B 10/25* (2013.01); *H04Q 9/00* (2013.01); *H04Q 2209/30* (2013.01)

(58) Field of Classification Search
CPC ...... E21B 47/114; E21B 43/12; E21B 47/135; H04B 10/25; H04Q 9/00; H04Q 2209/30
See application file for complete search history.

(56) References Cited

U.S. PATENT DOCUMENTS

| | | | |
|---|---|---|---|
| 2008/0120036 A1 | 5/2008 | Kimminau et al. | |
| 2009/0173494 A1 | 7/2009 | Tarvin et al. | |
| 2010/0082258 A1* | 4/2010 | Wang | E21B 47/103 |
| | | | 702/12 |
| 2011/0040536 A1* | 2/2011 | Levitan | G01V 99/005 |
| | | | 703/2 |
| 2013/0346035 A1* | 12/2013 | Madasu | E21B 43/00 |
| | | | 703/2 |
| 2014/0180592 A1 | 6/2014 | Ravi et al. | |

(Continued)

OTHER PUBLICATIONS

International Search Report and Written Opinion for PCT application No. PCT/US2021/039401, issued Mar. 3, 2022, 9 pages.

*Primary Examiner* — Yanick A Akaragwe
(74) *Attorney, Agent, or Firm* — NOVAK DRUCE CARROLL LLP

(57) ABSTRACT

Aspects of the subject technology relate to systems and methods for optimizing production flow monitoring by utilizing data driven in-situ injection. Systems and methods are provided for receiving sensor data from at least one of a distributed fiber optic sensing line positioned along a wellbore and a plurality of subsurface and surface sensors, generating flow models based on the sensor data received from the at least one of the distributed fiber optic sensing line and the plurality of subsurface and surface sensors to optimize production flow, and generating flow profiles based on the flow models and the sensor data received from the at least one of the distributed fiber optic sensing line and the plurality of subsurface and surface sensors to adjust zonal inflow device.

20 Claims, 19 Drawing Sheets

(56) References Cited

U.S. PATENT DOCUMENTS

| | | | |
|---|---|---|---|
| 2015/0122490 A1* | 5/2015 | Greening | E21B 19/06 166/250.01 |
| 2016/0061003 A1* | 3/2016 | Gottumukkala | E21B 34/16 166/50 |
| 2016/0251957 A1 | 9/2016 | Mcewen-King et al. | |
| 2018/0149015 A1* | 5/2018 | Duan | E21B 47/06 |
| 2020/0018158 A1* | 1/2020 | Kim | E21B 49/00 |
| 2020/0174149 A1* | 6/2020 | Thiruvenkatanathan | G01V 1/307 |

* cited by examiner

DATA DRIVEN IN-SITU INJECTION AND PRODUCTION FLOW MONITORING

TECHNICAL FIELD

The present technology pertains to optimizing production flow monitoring, and more particularly, to optimizing production flow monitoring by utilizing data driven in-situ injection.

BACKGROUND

Accurate production monitoring flow models are very difficult to develop due to a number of reasons ranging from differences between well and reservoir properties, production depletion over time, drilling and wellbore related effects from well-to-well, and flow loop test facility limitations in terms of noise environment and scale. These are aspects that have been very difficult to address using conventional technology.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
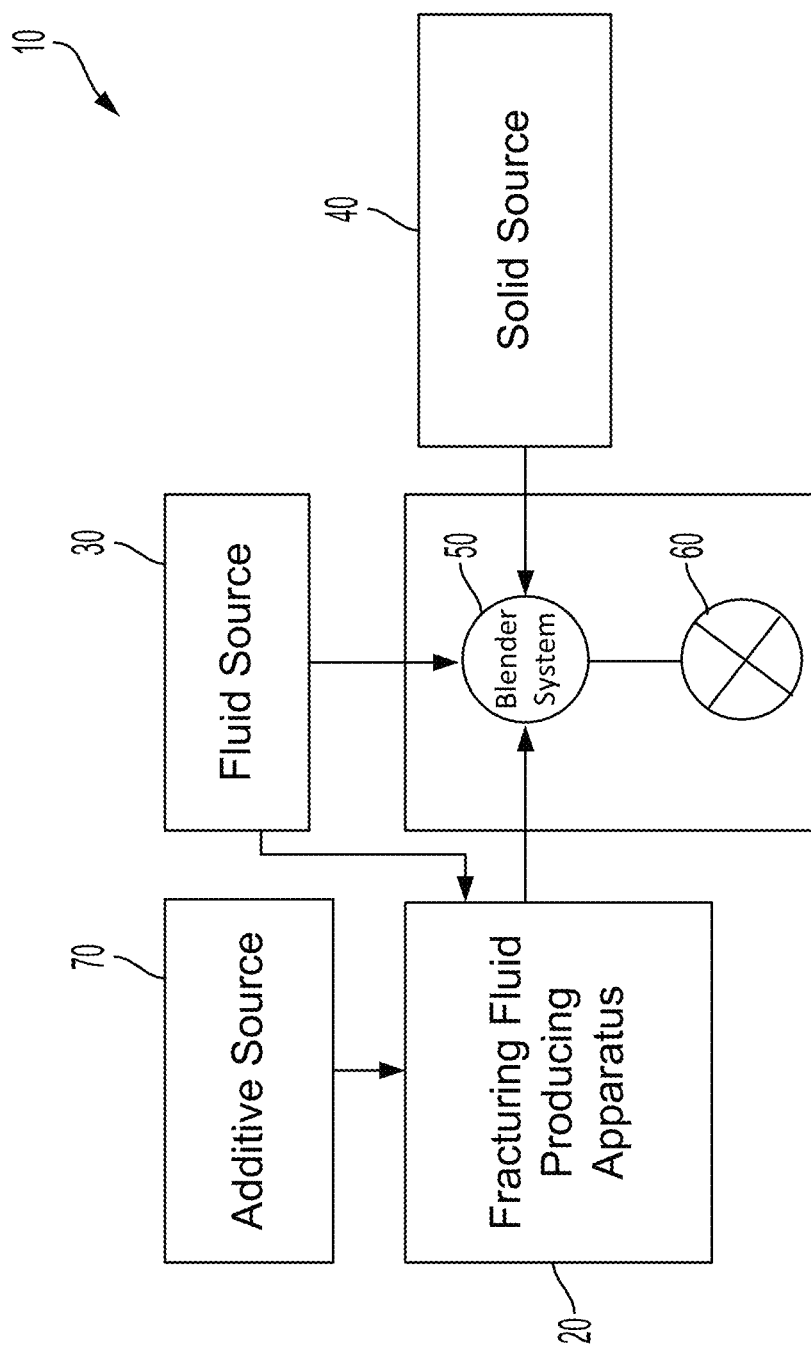
FIG. 1 illustrates a schematic diagram of an example fracturing system, in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Hydraulic fracturing is a stimulation treatment process that improves well productivity by forming fractures in a formation from a wellbore. Hydraulic fracturing is typically performed by injecting a fracturing fluid into a wellbore at a high rate to exert sufficient pressure to create or extend fractures in the formation. During the fracturing operation, proppant is also injected into the formation and into the fractures to prevent fractures from closing and allow hydrocarbons to flow from the reservoir to the wellbore.

Currently, accurate production monitoring flow models are very difficult to develop due to a number of reasons ranging from differences between well and reservoir properties, production depletion over time, drilling and wellbore related effects from well-to-well, and flow loop test facility limitations in terms of noise environment and scale. These are aspects that have been very difficult to address using conventional technology.

The disclosed technology addresses the foregoing by utilizing a controlled approach to vary inflow rates in completions with zonal inflow control. For example, the disclosed technology can measure subsurface data and surface flow rates as a function of inflow rates in a predetermined manner. The disclosed technology can further utilize progressive elaboration to cover a suitable envelope of data collection points in order to generate a data set that can be used to generate a well-specific production flow model using a data driven approach. The production monitoring model can also be customized for each well and updated over time as additional data becomes available.

In various embodiments, a method for optimizing production flow monitoring by utilizing data driven in-situ injection. The method can include receiving sensor data from at least one of a distributed fiber optic sensing line positioned along a wellbore and a plurality of subsurface and surface sensors. The method can also include generating flow models based on the sensor data received from the at least one of the distributed fiber optic sensing line and the plurality of subsurface and surface sensors to optimize production flow. The method can further include generating flow profiles based on the flow models and the sensor data received from the at least one of the distributed fiber optic sensing line and the plurality of subsurface and surface sensors to adjust zonal inflow device.

In various embodiments, a system for optimizing production flow monitoring by utilizing data driven in-situ injection can include one or more processors and at least one computer-readable storage medium having stored therein instructions which, when executed by the one or more processors, cause the system to receive sensor data from at least one of a distributed fiber optic sensing line positioned along a wellbore and a plurality of subsurface and surface sensors. The instructions can further cause the system to generate flow models based on the sensor data received from the at least one of the distributed fiber optic sensing line and the plurality of subsurface and surface sensors to optimize production flow. The instructions can also cause the system to generate flow profiles based on the flow models and the sensor data received from the at least one of the distributed fiber optic sensing line and the plurality of subsurface and surface sensors to adjust zonal inflow device.

In various embodiments, a non-transitory computer-readable storage medium comprising instructions stored the non-transitory computer-readable storage medium, the instructions, when executed by one or more processors, cause the one or more processors to receive sensor data from at least one of a distributed fiber optic sensing line positioned along a wellbore and a plurality of subsurface and surface sensors. The instructions can further cause the one or more processors to generate flow models based on the sensor data received from the at least one of the distributed fiber optic sensing line and the plurality of subsurface and surface sensors to optimize production flow. The instructions can also cause the one or more processors to generate flow profiles based on the flow models and the sensor data received from the at least one of the distributed fiber optic sensing line and the plurality of subsurface and surface sensors to adjust zonal inflow device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Referring to FIG. 1, an example fracturing system 10 is shown. The example fracturing system 10 shown in FIG. 1 can be implemented using the systems, methods, and techniques described herein. In particular, the disclosed system, methods, and techniques may directly or indirectly affect one or more components or pieces of equipment associated with the example fracturing system 10, according to one or more embodiments. The fracturing system 10 includes a fracturing fluid producing apparatus 20, a fluid source 30, a solid source 40, and a pump and blender system 50. All or an applicable combination of these components of the fracturing system 10 can reside at the surface at a well site/fracturing pad where a well 60 is located.

During a fracturing job, the fracturing fluid producing apparatus 20 can access the fluid source 30 for introducing/controlling flow of a fluid, e.g. a fracturing fluid, in the fracturing system 10. While only a single fluid source 30 is shown, the fluid source 30 can include a plurality of separate fluid sources. Further, the fracturing fluid producing apparatus 20 can be omitted from the fracturing system 10. In turn, the fracturing fluid can be sourced directly from the fluid source 30 during a fracturing job instead of through the intermediary fracturing fluid producing apparatus 20.

The fracturing fluid can be an applicable fluid for forming fractures during a fracture stimulation treatment of the well 60. For example, the fracturing fluid can include water, a hydrocarbon fluid, a polymer gel, foam, air, wet gases, and/or other applicable fluids. In various embodiments, the fracturing fluid can include a concentrate to which additional fluid is added prior to use in a fracture stimulation of the well 60. In certain embodiments, the fracturing fluid can include a gel pre-cursor with fluid, e.g. liquid or substantially liquid, from fluid source 30. Accordingly, the gel pre-cursor with fluid can be mixed by the fracturing fluid producing apparatus 20 to produce a hydrated fracturing fluid for forming fractures.

The solid source 40 can include a volume of one or more solids for mixture with a fluid, e.g. the fracturing fluid, to form a solid-laden fluid. The solid-laden fluid can be pumped into the well 60 as part of a solids-laden fluid stream that is used to form and stabilize fractures in the well 60 during a fracturing job. The one or more solids within the solid source 40 can include applicable solids that can be added to the fracturing fluid of the fluid source 30. Specifically, the solid source 40 can contain one or more proppants for stabilizing fractures after they are formed during a fracturing job, e.g. after the fracturing fluid flows out of the formed fractures. For example, the solid source 40 can contain sand.

The fracturing system 10 can also include additive source 70. The additive source 70 can contain/provide one or more applicable additives that can be mixed into fluid, e.g. the fracturing fluid, during a fracturing job. For example, the additive source 70 can include solid-suspension-assistance agents, gelling agents, weighting agents, and/or other optional additives to alter the properties of the fracturing fluid. The additives can be included in the fracturing fluid to reduce pumping friction, to reduce or eliminate the fluid's reaction to the geological formation in which the well is formed, to operate as surfactants, and/or to serve other applicable functions during a fracturing job. The additives can function to maintain solid particle suspension in a mixture of solid particles and fracturing fluid as the mixture is pumped down the well 60 to one or more perforations.

The pump and blender system 50 functions to pump fracture fluid into the well 60. Specifically, the pump and blender system 50 can pump fracture fluid from the fluid source 30, e.g. fracture fluid that is received through the fracturing fluid producing apparatus 20, into the well 60 for forming and potentially stabilizing fractures as part of a fracture job. The pump and blender system 50 can include one or more pumps. Specifically, the pump and blender system 50 can include a plurality of pumps that operate together, e.g. concurrently, to form fractures in a subterranean formation as part of a fracturing job. The one or more pumps included in the pump and blender system 50 can be an applicable type of fluid pump. For example, the pumps in the pump and blender system 50 can include electric pumps and/or hydrocarbon and hydrocarbon mixture powered pumps. Specifically, the pumps in the pump and blender system 50 can include diesel powered pumps, natural gas powered pumps, and diesel combined with natural gas powered pumps.

The pump and blender system 50 can also function to receive the fracturing fluid and combine it with other components and solids. Specifically, the pump and blender system 50 can combine the fracturing fluid with volumes of solid particles, e.g. proppant, from the solid source 40 and/or additional fluid and solids from the additive source 70. In turn, the pump and blender system 50 can pump the resulting mixture down the well 60 at a sufficient pumping rate to create or enhance one or more fractures in a subterranean zone, for example, to stimulate production of fluids from the zone. While the pump and blender system 50 is described to perform both pumping and mixing of fluids and/or solid particles, in various embodiments, the pump and blender system 50 can function to just pump a fluid stream, e.g. a fracture fluid stream, down the well 60 to create or enhance one or more fractures in a subterranean zone.

The fracturing fluid producing apparatus 20, fluid source 30, and/or solid source 40 may be equipped with one or more monitoring devices (not shown). The monitoring devices can be used to control the flow of fluids, solids, and/or other compositions to the pumping and blender system 50. Such monitoring devices can effectively allow the pumping and blender system 50 to source from one, some or all of the different sources at a given time. In turn, the pumping and blender system 50 can provide just fracturing fluid into the well at some times, just solids or solid slurries at other times, and combinations of those components at yet other times.

Figure 2:
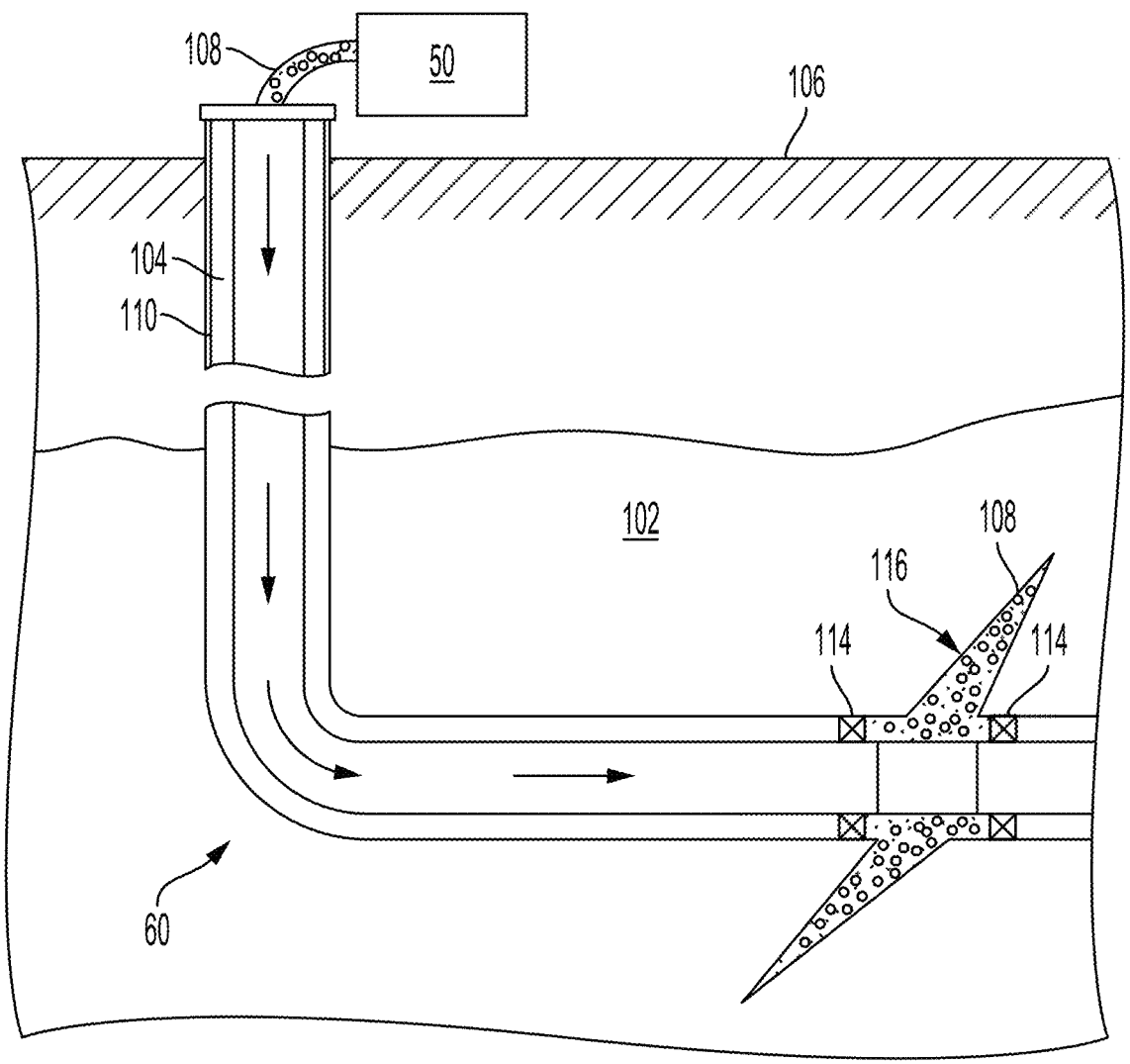
FIG. 2 illustrates a well during a fracturing operation in a portion of a subterranean formation of interest surrounding a wellbore, in accordance with aspects of the present disclosure.

FIG. 2 shows the well 60 during a fracturing operation in a portion of a subterranean formation of interest 102 surrounding a wellbore 104. The fracturing operation can be performed using one or an applicable combination of the components in the example fracturing system 10 shown in FIG. 1. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore 104. The wellbore 104 can include a casing 110 that is cemented or otherwise secured to the wellbore wall. The wellbore 104 can be uncased or otherwise include uncased sections. Perforations can be formed in the casing 110 to allow fracturing fluids and/or other materials to flow into the subterranean formation 102. As will be discussed in greater detail below, perforations can be formed in the casing 110 using an applicable wireline-free actuation or a wireline that deploys perforation guns. In the example fracture operation shown in FIG. 2, a perforation is created between points 114.

The pump and blender system 50 is fluidly coupled to the wellbore 104 to pump the fracturing fluid 108, and potentially other applicable solids and solutions into the wellbore 104. When the fracturing fluid 108 is introduced into wellbore 104 it can flow through at least a portion of the wellbore 104 to the perforation, defined by points 114. The fracturing fluid 108 can be pumped at a sufficient pumping rate through at least a portion of the wellbore 104 to create one or more fractures 116 through the perforation and into the subterranean formation 102. Specifically, the fracturing fluid 108 can be pumped at a sufficient pumping rate to create a sufficient hydraulic pressure at the perforation to form the one or more fractures 116. Further, solid particles, e.g. proppant from the solid source 40, can be pumped into the wellbore 104, e.g. within the fracturing fluid 108 towards the perforation. In turn, the solid particles can enter the fractures 116 where they can remain after the fracturing fluid flows out of the wellbore. These solid particles can stabilize or otherwise "prop" the fractures 116 such that fluids can flow freely through the fractures 116.

While only two perforations at opposing sides of the wellbore 104 are shown in FIG. 2, as will be discussed in greater detail below, greater than two perforations can be formed in the wellbore 104, e.g. along the top side of the wellbore 104, as part of a perforation cluster. Fractures can then be formed through the plurality of perforations in the perforation cluster as part of a fracturing stage for the perforation cluster. Specifically, fracturing fluid and solid particles can be pumped into the wellbore 104 and pass through the plurality of perforations during the fracturing stage to form and stabilize the fractures through the plurality of perforations.

Figure 3:
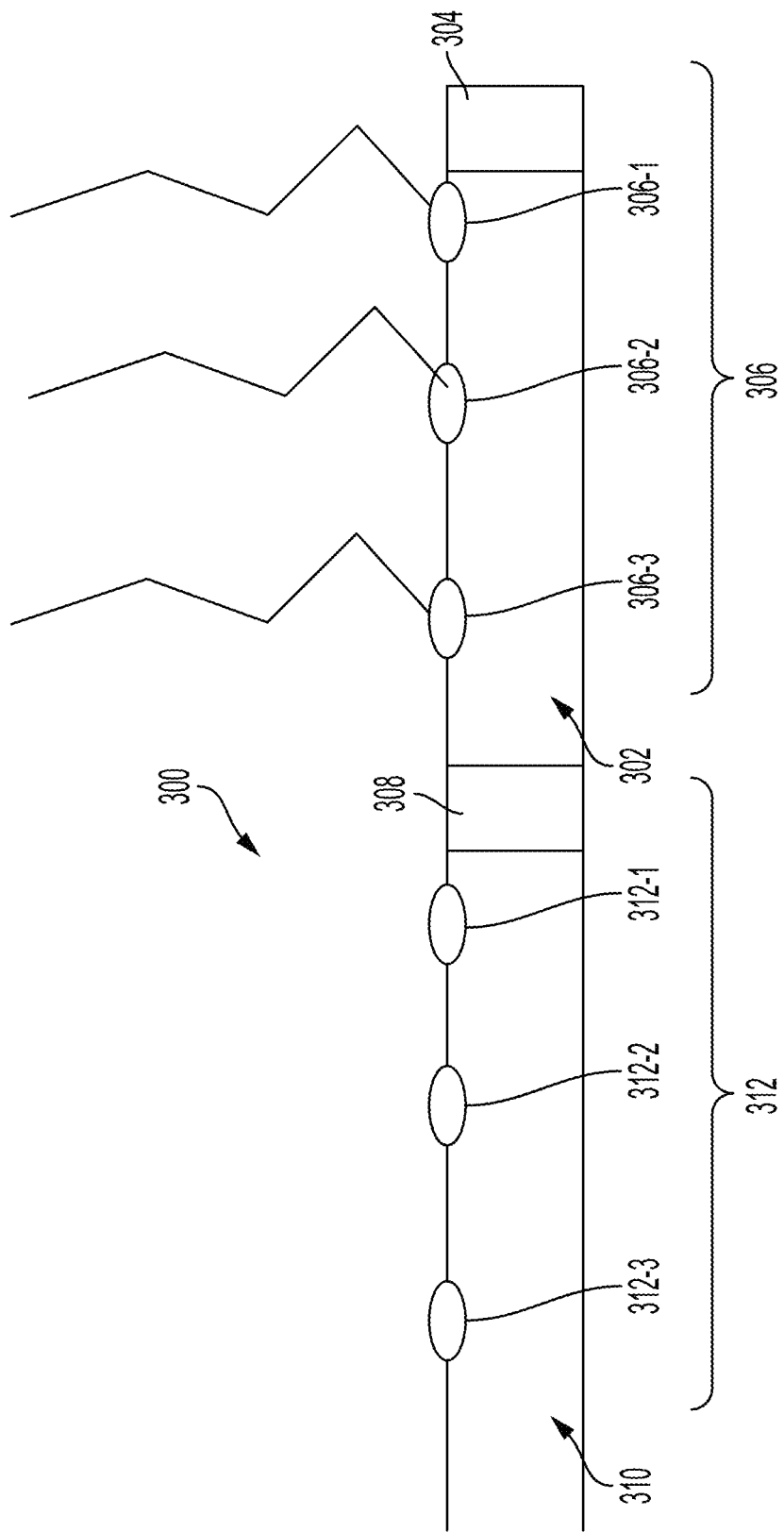
FIG. 3 illustrates a portion of a wellbore that is fractured using multiple fracture stages, in accordance with aspects of the present disclosure.

FIG. 3 shows a portion of a wellbore 300 that is fractured using multiple fracture stages. Specifically, the wellbore 300 is fractured in multiple fracture stages using a plug-and-perf technique.

The example wellbore 300 includes a first region 302 within a portion of the wellbore 300. The first region 302 can be positioned in proximity to a terminal end of the wellbore 300. The first region 302 is formed within the wellbore 300, at least in part, by a plug 304. Specifically, the plug 304 can function to isolate the first region 302 of the wellbore 300 from another region of the wellbore 300, e.g. by preventing the flow of fluid from the first region 302 to another region of the wellbore 300. The region isolated from the first region 302 by the plug 304 can be the terminal region of the wellbore 300. Alternatively, the region isolated from the first region 302 by the plug 304 can be a region of the wellbore 300 that is closer to the terminal end of the wellbore 300 than the first region 302. While the first region 302 is shown in FIG. 3 to be formed, at least in part, by the plug 304, in various embodiments, the first region 302 can be formed, at least in part, by a terminal end of the wellbore 300 instead of the plug 304. Specifically, the first region 302 can be a terminal region within the wellbore 300.

The first region 302 includes a first perforation 306-1, a second perforation 306-2, and a third perforation 306-3. The first perforation 306-1, the second perforation 306-2, and the third perforation 306-3 can form a perforation cluster 306 within the first region 302 of the wellbore 300. While three perforations are shown in the perforation cluster 306, in various embodiments, the perforation cluster 306 can include fewer or more perforations. As will be discussed in greater detail later, fractures can be formed and stabilized within a subterranean formation through the perforations 306-1, 306-2, and 306-3 of the perforation cluster 306 within the first region 302 of the wellbore 300. Specifically, fractures can be formed and stabilized through the perforation cluster 306 within the first region 302 by pumping fracturing fluid and solid particles into the first region 302 and through the perforations 306-1, 306-2, and 306-3 into the subterranean formation.

The example wellbore 300 also includes a second region 310 positioned closer to the wellhead than the first region 302. Conversely, the first region 302 is in closer proximity to a terminal end of the wellbore 300 than the second region 310. For example, the first region 302 can be a terminal region of the wellbore 300 and therefore be positioned closer to the terminal end of the wellbore 300 than the second region 310. The second region 310 is isolated from the first region 302 by a plug 308 that is positioned between the first region 302 and the second region 310. The plug 308 can fluidly isolate the second region 310 from the first region 302. As the plug 308 is positioned between the first and second regions 302 and 310, when fluid and solid particles are pumped into the second region 310, e.g. during a fracture stage, the plug 308 can prevent the fluid and solid particles from passing from the second region 310 into the first region 302.

The second region 310 includes a first perforation 312-1, a second perforation 312-2, and a third perforation 312-3. The first perforation 312-1, the second perforation 312-2, and the third perforation 312-3 can form a perforation cluster 312 within the second region 310 of the wellbore 300. While three perforations are shown in the perforation cluster 312, in various embodiments, the perforation cluster 312 can include fewer or more perforations. As will be discussed in greater detail later, fractures can be formed and stabilized within a subterranean formation through the perforations 312-1, 312-2, and 312-3 of the perforation cluster 312 within the second region 310 of the wellbore 300. Specifically, fractures can be formed and stabilized through the perforation cluster 312 within the second region 310 by pumping fracturing fluid and solid particles into the second region 310 and through the perforations 312-1, 312-2, and 312-3 into the subterranean formation.

In fracturing the wellbore 300 in multiple fracturing stages through a plug-and-perf technique, the perforation cluster 306 can be formed in the first region 302 before the second region 310 is formed using the plug 308. Specifically, the perforations 306-1, 306-2, and 306-3 can be formed before the perforations 312-1, 312-2, and 312-3 are formed in the second region 310. The perforations 306-1, 306-2, and 306-3 can be formed using a wireline-free actuation. Once the perforations 306-1, 306-2, and 306-3 are formed, fracturing fluid and solid particles can be transferred through the wellbore 300 into the perforations 306-1, 306-2, and 306-3 to form and stabilize fractures in the subterranean formation as part of a first fracturing stage. The fracturing fluid and solid particles can be transferred from a wellhead of the wellbore 300 to the first region 302 through the second region 310 of the wellbore 300. Specifically, the fracturing fluid and solid particles can be transferred through the second region 310 before the second region 310 is formed, e.g. using the plug 308, and the perforation cluster 312 is formed. This can ensure, at least in part, that the fracturing fluid and solid particles flow through the second region 310 and into the subterranean formation through the perforations 306-1, 306-2, and 306-3 within the perforation cluster 306 in the first region 302.

After the fractures are formed through the perforations 306-1, 306-2, and 306-3, the wellbore 300 can be filled with the plug 308. Specifically, the wellbore 300 can be plugged with the plug 308 to form the second region 310. Then, the perforations 312-1, 312-2, and 312-3 can be formed, e.g. using a wireline-free actuation. Once the perforations 312-1, 312-2, and 312-3 are formed, fracturing fluid and solid particles can be transferred through the wellbore 300 into the perforations 312-1, 312-2, and 312-3 to form and stabilize fractures in the subterranean formation as part of a second fracturing stage. The fracturing fluid and solid particles can be transferred from the wellhead of the wellbore 300 to the second region 310 while the plug 308 prevents transfer of the fluid and solid particles to the first region 302. This can effectively isolate the first region 302 until the first region 302 is accessed for production of resources, e.g. hydrocarbons. After the fractures are formed through the perforation cluster 312 in the second region 310, a plug can be positioned between the second region 310 and the wellhead, e.g. to fluidly isolate the second region 310. This process of forming perforations and forming fractures during a fracture stage, followed by plugging on a region by region basis can be repeated. Specifically, this process can be repeated up the wellbore towards the wellhead until a completion plan for the wellbore 300 is finished.

Figure 4:
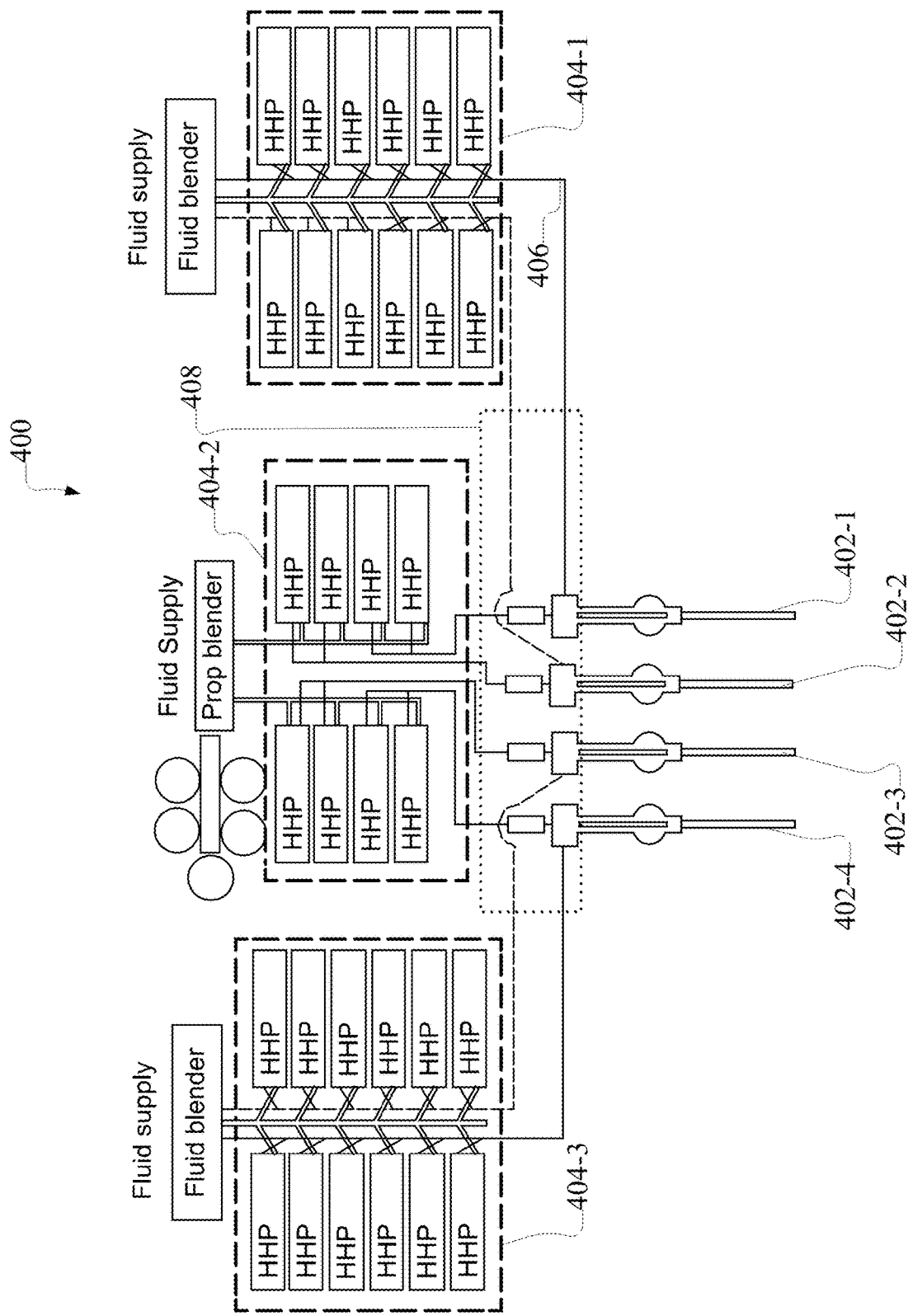
FIG. 4 illustrates an example fracturing system for concurrently performing fracturing stages in multiple wellbores, in accordance with aspects of the present disclosure.

FIG. 4 shows an example fracturing system 400 for concurrently performing fracturing stages in multiple wellbores. The example fracturing system 400 can be implemented using one or an applicable combination of the components shown in the example fracturing system 10 shown in FIG. 1. Further, the example fracturing system 400 can form fractures according to the example techniques implemented in the well 60 shown in FIG. 2 and the wellbore 300 shown in FIG. 3.

The example fracturing system 400 includes a first wellbore 402-1, a second wellbore 402-2, a third wellbore 402-3, and a fourth wellbore 402-4, collectively referred to as the wellbores 402. While four wellbores 402 are shown, the fracturing system 400 can include three or two wellbores, as long as the fracturing system 400 includes more than one wellbore. Further, the fracturing system 400 can include more than four wellbores.

The example fracturing system 400 also includes a first pump 404-1, a second pump 404-2, and a third pump 404-3, collectively referred to as a pumping system 404. While the pumping system is shown as including three separate pumps, the pumping system 404 can include fewer than three pumps or more than three pumps. For example, the pumping system 404 can include only a single pump. In some implementations, the first pump 404-1 can include a set of pumps where each block (HHP) can be one pump. Fluid coupling 406 (e.g., indicated by the solid line 406) can couple the six pumps (HHP) on the right side that feed fluid to the first wellbore 402-1. The second pump 404-2 can add proppant to the mix and be supported by the two lower right HHP blocks/pumps to the first well 402-1. In some examples, the fracturing system 400 can include eight sets of pumps that are correspondingly coupled to the four wellbores 402-1, 402-2, 402-3, 402-4. The pumping system 404 can also include three sets of pumps, where the first pump 404-1 includes two sets of pumps and the third pump 404-3 includes two sets of pumps that share a common fluid blender. The second pump 404-2 can include four sets of pumps that share a common proppant blender. In another example, eight sets of pumps can support four sets of wells, where each well is supported by one fluid pump set and one proppant pump set.

The pumping system 404 is fluidly connected to each of the wellbores 402. Specifically, the pumping system 404 can be fluidly connected to each of the wellbores 402, at least in part, through one or more fluid couplings, e.g. fluid coupling 406. In being fluidly connected to each of the wellbores 402, the pumping system 404 can pump fracturing fluid and solid particles, e.g. proppant, into the wellbores 402 for forming and stabilizing fractures through the wellbores 402. Specifically, the pumping system 404 can pump fracturing fluid and solid particles into the wellbores 402 for forming and stabilizing fractures through passages and/or perforations in the wellbores 402. The pumping system 404 can pump fracturing fluid into the wellbores 402 for forming fractures in the wellbores 402 according to the previously described plug-and-perf technique. Further, the pumping system 404 can pump solid particles, e.g. proppant, in a solid-laden fluid stream into the wellbores 402 for stabilizing the fractures according to the previously described plug-and-perf technique. In being fluidly connected to each of the wellbores 402, the pumping system 404 can pump additional components, e.g. additives, into the wellbores 402 for aiding in the formation and/or stabilization of fractures in the wellbores 402.

Figure 5:
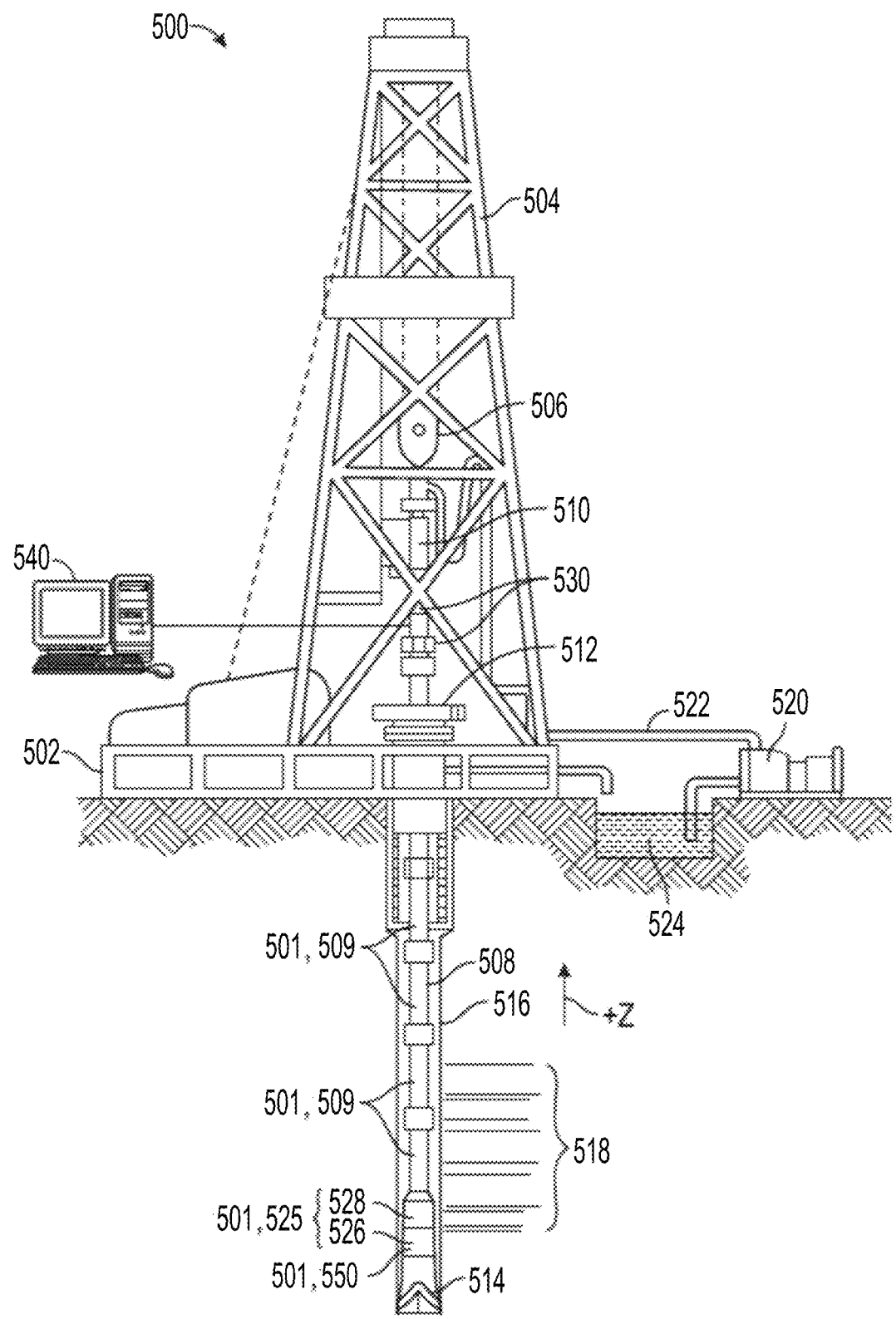
FIG. 5 illustrates an example diagram of an environment in which a drilling system may be used, in accordance with aspects of the present disclosure.

FIG. 5 illustrates a diagrammatic view of an example wellbore drilling environment 500, for example, a logging while drilling (LWD) and/or measurement while drilling (MWD) wellbore environment, in which the present disclosure may be implemented. As illustrated in FIG. 5, a drilling platform 502 is equipped with a derrick 504 that supports a hoist 506 for raising and lowering one or more drilling components 501 which can include, for example, a drill string 508 which can include one or more drill collars 509, a drill bit 514, and/or a bottom-hole assembly 525. The drilling components 501 are operable to drill a wellbore 516. The drilling components 501 also can include housings for one or more downhole tools. The drilling components 501 include at least one material having an actual yield strength. The actual yield strength can be determined and/or provided by the manufacturer of the drilling components 501. For example, the material of the drilling components 501 can be non-magnetic. In some examples, the material of the drilling components 501 can be stainless steel.

The hoist 506 suspends a top drive 510 suitable for rotating the drill string 508 and lowering the drill string 508 through the well head 512. Connected to the lower end of the drill string 508 is a drill bit 514. As the drill bit 514 rotates, the drill bit 514 creates a wellbore 516 that passes through various formations 518. A pump 520 circulates drilling fluid through a supply pipe 522 to top drive 510, down through the interior of drill string 508, through orifices in drill bit 514, back to the surface via the annulus around drill string 508, and into a retention pit 524. The drilling fluid transports cuttings from the wellbore 516 into the pit 524 and aids in maintaining the integrity of the wellbore 516. Various materials can be used for drilling fluid, including oil-based fluids and water-based fluids.

Referring to FIG. 5, sensors 526 can be provided, for example integrated into the bottom-hole assembly 525 near the drill bit 514. As the drill bit 514 extends the wellbore 516 through the formations 518, the sensors 526 can collect measurements of various drilling parameters, for example relating to various formation properties, the orientation of the drilling component(s) 501, dog leg severity, pressure, temperature, weight on bit, torque on bit, and/or rotations per minute. The sensors 526 can be any suitable sensor to measure the drilling parameters, for example transducers, fiber optic sensors, and/or surface and/or downhole sensors. The bottom-hole assembly 525 may also include a telemetry sub 528 to transfer measurement data to a surface receiver 530 and to receive commands from the surface. In some examples, the telemetry sub 528 communicates with a surface receiver 530 using mud pulse telemetry. In other examples, the telemetry sub 528 does not communicate with the surface, but rather stores logging data for later retrieval at the surface when the logging assembly is recovered. Notably, one or more of the bottom-hole assembly 525, the sensors 526, and the telemetry sub 528 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface.

Each of the sensors 526 may include a plurality of tool components, spaced apart from each other, and communicatively coupled with one or more wires. The telemetry sub 528 may include wireless telemetry or logging capabilities, or both, such as to transmit information in real time indicative of actual downhole drilling parameters to operators on the surface.

The sensors 526, for example an acoustic logging tool, may also include one or more computing devices 550 communicatively coupled with one or more of the plurality of drilling components 501. The computing device 550 may be configured to control or monitor the performance of the sensors 526, process logging data, and/or carry out the methods of the present disclosure.

In some examples, one or more of the sensors 526 may communicate with a surface receiver 530, such as a wired drillpipe. In other cases, the one or more of the sensors 526 may communicate with a surface receiver 530 by wireless signal transmission. In at least some cases, one or more of the sensors 526 may receive electrical power from a wire that extends to the surface, including wires extending through a wired drillpipe. In at least some examples the methods and techniques of the present disclosure may be performed by a controller 540, for example a computing device, on the surface. The controller 540 is discussed in further detail below. In some examples, the controller 540 may be included in and/or communicatively coupled with surface receiver 530. For example, surface receiver 530 of wellbore operating environment 500 at the surface may include one or more of wireless telemetry, processor circuitry, or memory facilities, such as to support substantially real-time processing of data received from one or more of the sensors 526. In some examples, data can be processed at some time subsequent to its collection, wherein the data may be stored on the surface at surface receiver 530, stored downhole in telemetry sub 528, or both, until it is retrieved for processing.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Multiphase production profiling can be an essential component of a production management program. A production management program can incorporate multidisciplinary technologies. For example, each production management program can be unique and be designed exclusively for a reservoir of interest. One of the elements of production management can include production optimization. Production optimization can include early identification of inefficiencies when they occur. However, there are factors that can be challenging and hinder efforts to obtain desired results of the production management program. For example, insufficient surveillance data, in a timely manner, can be one of the factors that leads to a less effective production management program.

Production Logging Tools (PLT) can be utilized to address well surveillance in terms of multiphase production profiling. PLT may have limitations that can inhibit their use in some types of wells. Well completion types are an example of such a limitation. In some types of wells, PLT may be unable to be performed due to the complexity of the completion. Another limitation is the well intervention itself, which can pose a health, safety, and environment (HSE) risk. Moreover, the PLT can provide a snapshot of the well condition, as continuous monitoring of the dynamic nature of a well flow regime is not possible, which can introduce a fair degree of uncertainty in the reservoir surveillance data.

The disclosed technology can include continuous production monitoring that can provide several optimization opportunities such as minimizing water production through downhole or surface choking; improving oil/gas recovery through the adjustment of a choke size; identifying inefficient areas that may require improvement (e.g., workover/well intervention); reducing of reservoir water disposal when less water is produced; and reducing the cost associated with periodical PLT runs.

While PLT can deliver useful information relating to production data, the PLT may not be left in the well for a long period of time. In addition, PLT may not continuously measure entire producing intervals as PLT is a point sensor. For example, PLT may not be able to track entire reservoir production sensitivities to different flow regimes that are adjusted at a surface choke or at Interval Control Valves (ICV). Though smart wells are becoming more popular, they are still unable to provide fast manipulation of ICV's that result in production optimization.

Figure 6:
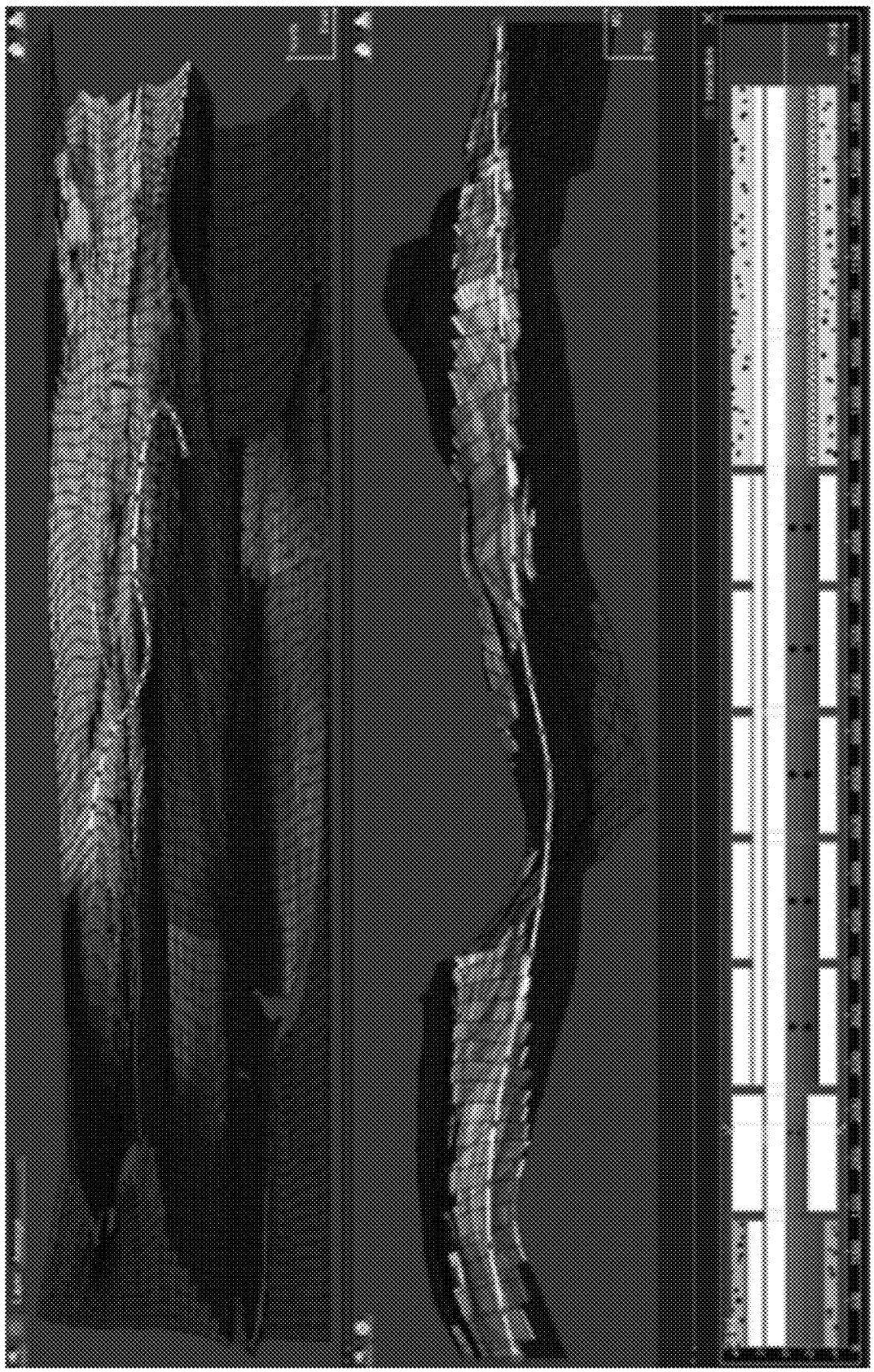
FIG. 6 illustrates an example production profile, in accordance with aspects of the present disclosure.

FIG. 6 illustrates an example production profile, in accordance with aspects of the present disclosure. In some implementations, the disclosed technology can include utilizing Pressure/Temperature (P/T) gauges to produce interval or multiple zones. A combination of P/T gauges and a reservoir model may enable empirical models assuming production from different intervals. In some examples, the disclosed technology can include utilizing a multiphase flow meter and enabling permanent production three-phase flow monitoring for oil and gas to provide field digitalization through automation and optimization. Automation of production profiling can provide a selection of solutions to optimize recovery and better manage production life cycle.

In some implementations, the production flow monitoring system as described herein can utilize Distributed Fiber Optic Sensing (DFOS), which can be a cost-effective solution that addresses some of the limitations of the PLT. Distributed Acoustic Sensing (DAS)/Distributed Temperature Sensing (DTS) production profiling can provide advantages over PLT, as it is less intrusive. In an example of a permanently installed fiber, the operation may be intervention-less, as the fiber is installed behind the casing or clamped to the outside of a tubing. By utilizing the DAS/DTS for production profiling, the fiber can be virtually static in the well. PLT, on the other hand, requires multiple passes up and down the hole to measure a flow velocity, thereby generating a piston-like effect in the well. This undulation can disturb the flow pattern and choke the flow in front of fluid entry points. The DAS/DTS measurements are immune to this effect.

DAS/DTS production profiling can also enhance the experience with well interventions. For example, retrievable fiber sensing can radically reduce the cost of well interventions. The ability of the production flow monitoring system to deliver three-phase production profiles can reduce tool string and provide plug-and-play availability for operators. For example, right after a coiled tubing well intervention in an oil well, the production flow monitoring system can run production profiling with the DAS/DTS without pulling out of hole to change the coil's bottom hole assembly (BHA).

The production flow monitoring system can provide three-phase flow profiling by utilizing DAS and DTS technology. The production flow monitoring system can also enable well surveillance and optimization such as anomaly detection, well integrity monitoring, and stimulation assessment and real time control.

Figure 7:
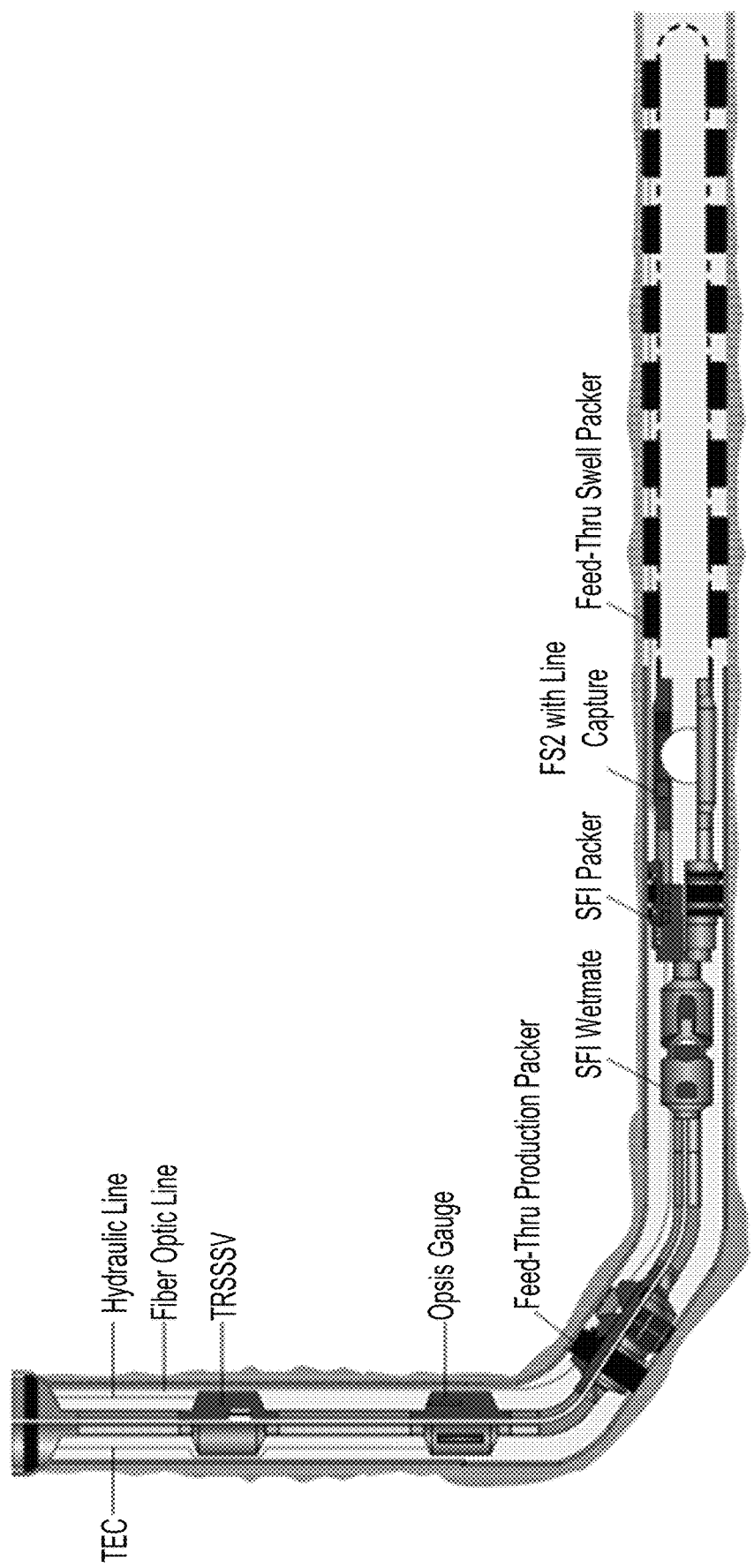
FIG. 7 illustrates a cross-sectional view of an example completion, in accordance with aspects of the present disclosure.

FIG. 7 illustrates a cross-sectional view of an example completion, in accordance with aspects of the present disclosure. In some implementations, a completion can include a Tubing Encapsulated Conductor (TEC), electrical cable used with electrical sensors and/or control of various electrical downhole devices, a hydraulic line, a fiber optic line, a Tubing Retrievable Subsurface Safety Valves (TRSSSV), Wireline Retrievable Subsurface Safety Valve (WRSSSV), Downhole Safety Valve (DHSV), this could be any flavor of a Subsurface Safety Valve (SSV) or (SSSV), a gauge (e.g., an Opsis gauge), a feed-thru production packer, a sandface instrumentation (SFI) wetmate, an SFI packer, an FS2 with line capture, and a feed-thru swell packer. In some examples, completions can include a completion run in two trips and by incorporating a wetmate connect. In another example, the completion can be performed in a single trip by utilizing an SFI system. The lower completion can change on a well-to-well basis, which can depend on the formation and the scope of the operation. In other examples, zonal isolation can be established by utilizing swell packers and by producing the well with a perforated liner. The well can also be produced by utilizing a mechanical sleeve or a surface valve.

When the well begins to produce water, by utilizing a surface controlled subsurface valve or by another mechanical device, a zone can be isolated to stop producing water. As treating and separating the produced water is exorbitantly high, it is useful for operators to know when the well begins to start producing water.

The production flow monitoring system can provide automation, machine learning, and artificial intelligence, while utilizing an optic fiber line as a sensing device. The production flow monitoring system can identify and isolate zones that produce water before the water becomes an issue to separate and treat.

Figure 8:
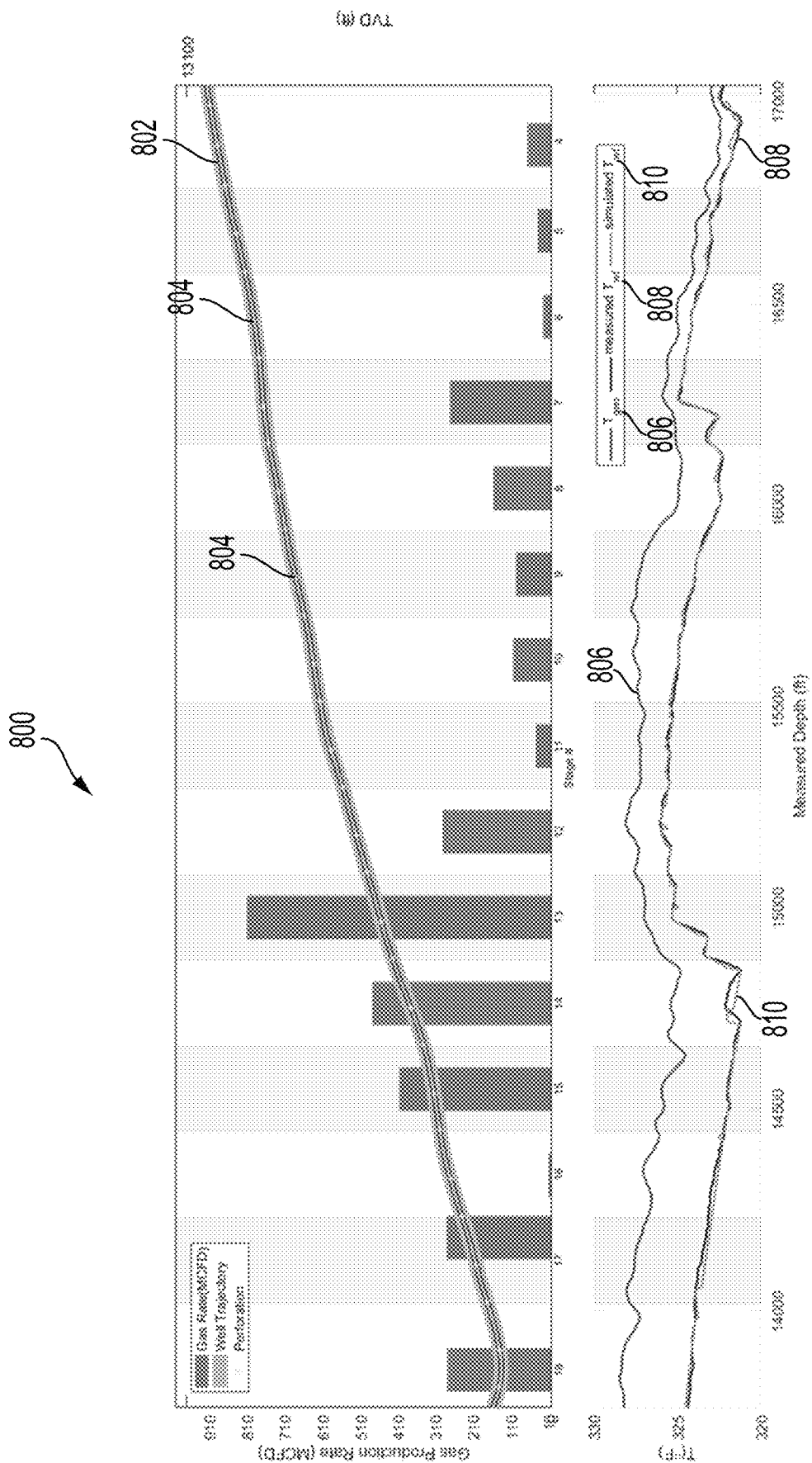
FIG. 8 illustrates example graphs of production profiles using a distributed temperature sensing fiber line, in accordance with aspects of the present disclosure.

FIG. 8 illustrates example graphs of production profiles using a distributed temperature sensing fiber line, in accordance with aspects of the present disclosure. The production flow monitoring system can utilize a DTS fiber optic line for production profiling in wells, e.g., gas wells where Joule-Thompson cooling is present. In addition to temperature data captured by the DTS fiber optic line, the production flow monitoring system can utilize production surface rates, reservoir data, well survey, and predefined production zones to allocate production accordingly. The production flow monitoring system can perform a number of iterations to reduce any misfit between the measured and simulated temperature traces by adjusting the production in each zone. For example, once a model converges, the production flow monitoring system can produce a final allocation by production zone, which can be converted into stages according to the well completion.

Referring to FIG. 8, the graphs of FIG. 8 illustrate the final results from a gas well 800. The top plot of FIG. 8 illustrates a gas production rate per stage with a well trajectory 802 superimposed on top of it, which also shows perforation locations 804 at each stage. The bottom plot of FIG. 8 illustrates three temperature traces: a shut-in trace 806, a production trace 808, and a simulated temperature 810.

Figure 9:
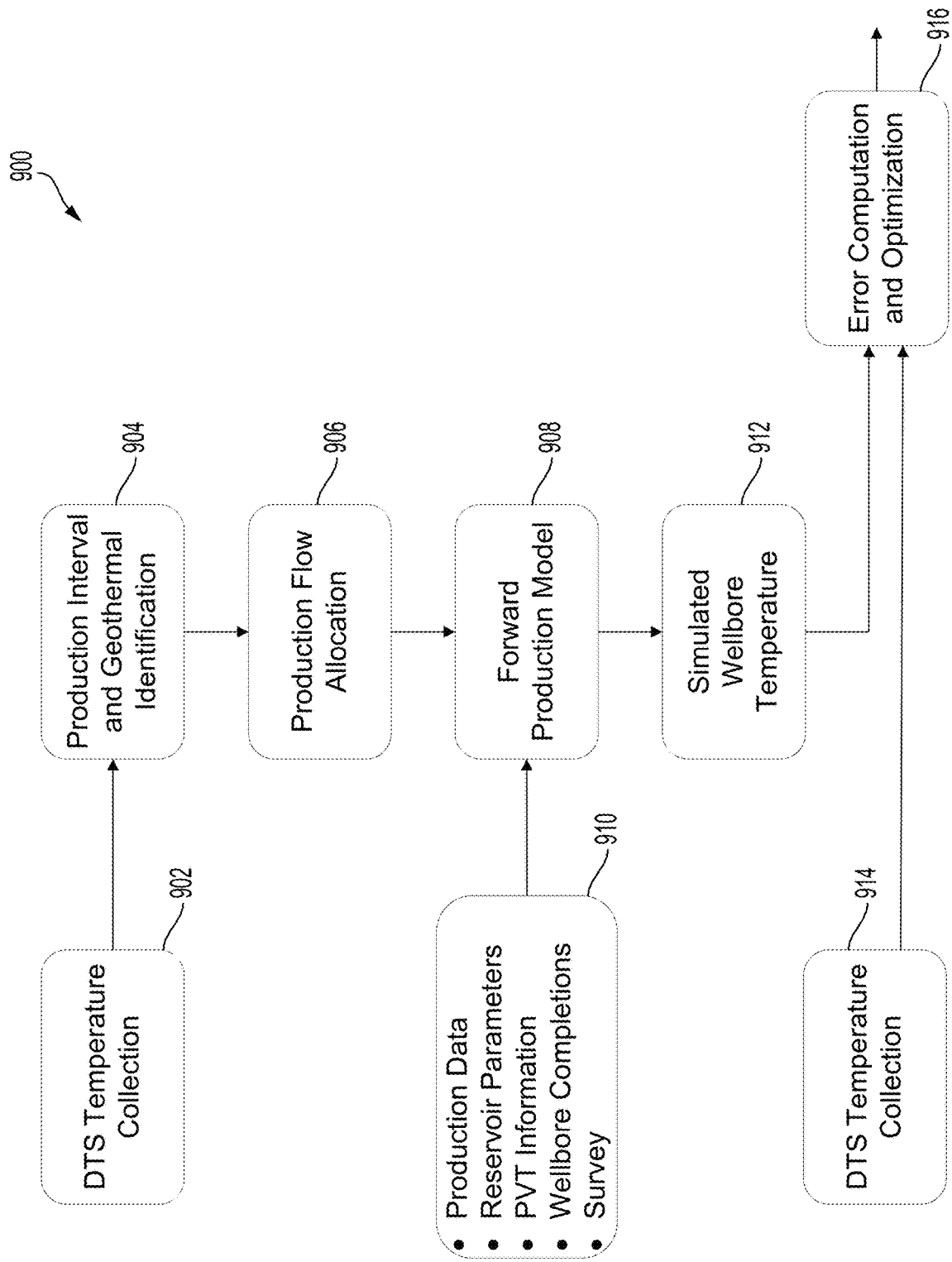
FIG. 9 illustrates an example process for determining a production profile, in accordance with aspects of the present disclosure.

FIG. 9 illustrates an example process for determining a production profile 900, in accordance with aspects of the present disclosure. At step 902, the process 900 can include receiving temperature data from a DTS fiber optic line. At step 904, the process 900 can include generate interval and geothermal identification. At step 906, the process 900 can include generating flow allocations. At step 908, the process 900 can include generating a production model based on the flow allocation of step 906, production data, reservoir parameters, pressure/volume/temperature (PVT) information, wellbore completions, and survey data. At step 912, the process 900 can include generating simulated wellbore temperature information. At step 916, the process 900 can included generating computation and optimization instructions based on the simulated wellbore temperature of step 912 and DTS temperature data received at step 914.

The process 900 can include utilizing a process flow for a physics-based thermal model where a measured temperature trace can be used to generate a production profile. The process 900 can be dependent on temperature differences along the wellbore, similar to what can be seen in gas wells with measurable Joule-Thompson cooling. However, this may not be the case in a long horizontal, liquid rich or liquid only producing wells (e.g., a liquid rich multi-phase flow) as fluid properties between oil and water may not produce distinct thermal differences.

Water ingress into oil and gas wells is also a growing issue. In some implementations, the production flow monitoring system can utilize a DTS production algorithm in a 3-phase mode. Having a robust multiphase DAS solution can assist in reducing degrees of uncertainty. Many brown fields are subject of periodical well interventions. The production flow monitoring system can bundle DAS/DTS three-phase profiling with standard well interventions that may deliver cost affordable production profiling solutions, where computational solutions are available. Utilizing production profiling during standard well interventions can dramatically reduce customer operating expenses.

In some implementations, the production flow monitoring system can allow for real time data processing, which can provide fully unmanned monitoring operations that have permanent DAS system running on site. The production flow monitoring system can further acquire, process, and upload results to a webserver, where the operator can access the data at their convenience. Gauge technology (e.g., Smartfiber gauge technology) can also add to the benefit of having multiphase production profiling (e.g., by utilizing the production flow monitoring system), as more and more fiber lines are positioned underground.

Figure 10:
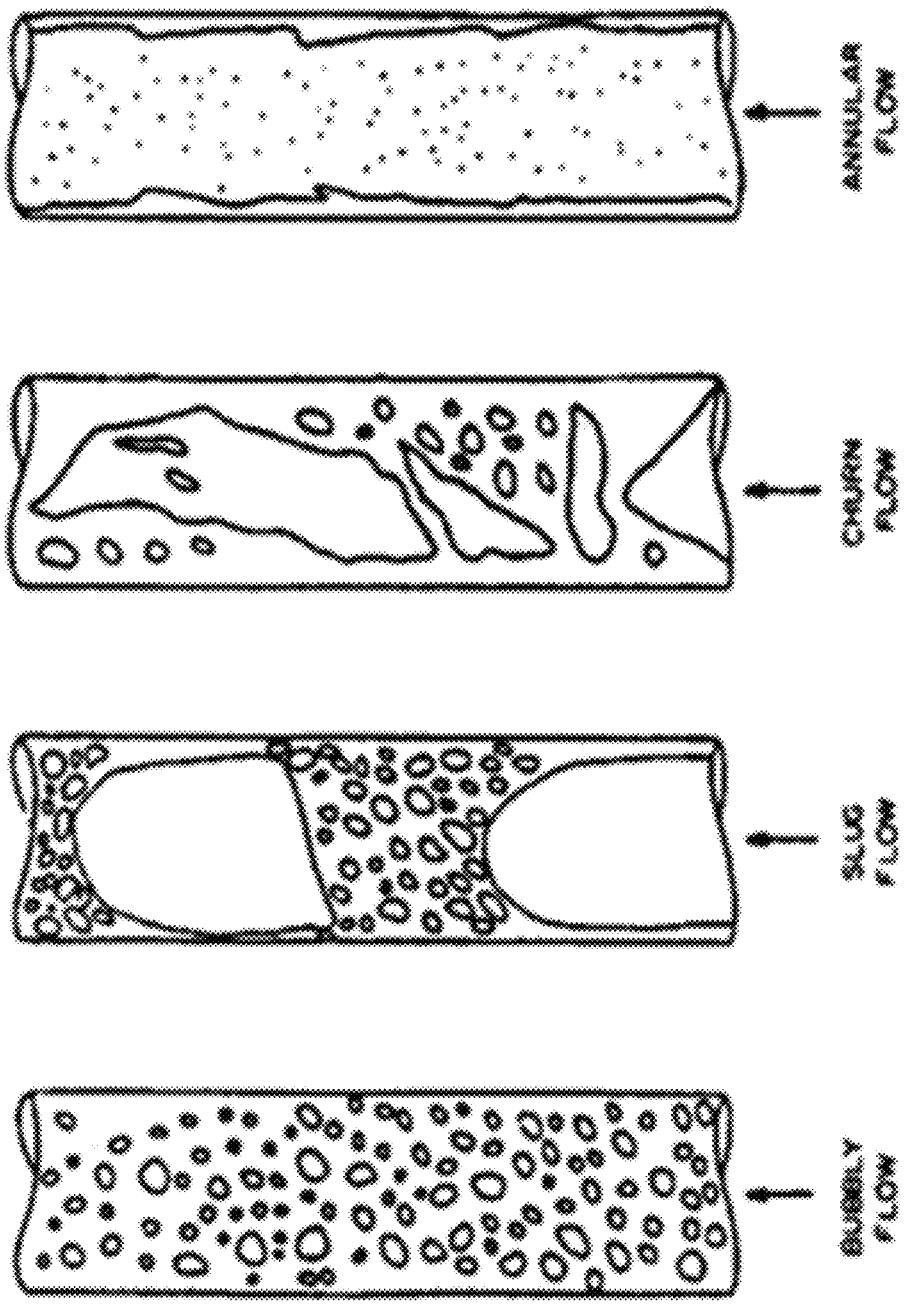
FIG. 10 illustrates example flow patterns in a two-phase vertical (e.g., upward) flow, in accordance with aspects of the present disclosure.

FIG. 10 illustrates example flow patterns in a two-phase vertical (e.g., upward) flow, in accordance with aspects of the present disclosure. The flow patterns in the two-phase vertical flow can include a bubbly flow, a slug flow, a churn flow, and an annular flow.

Figure 11:
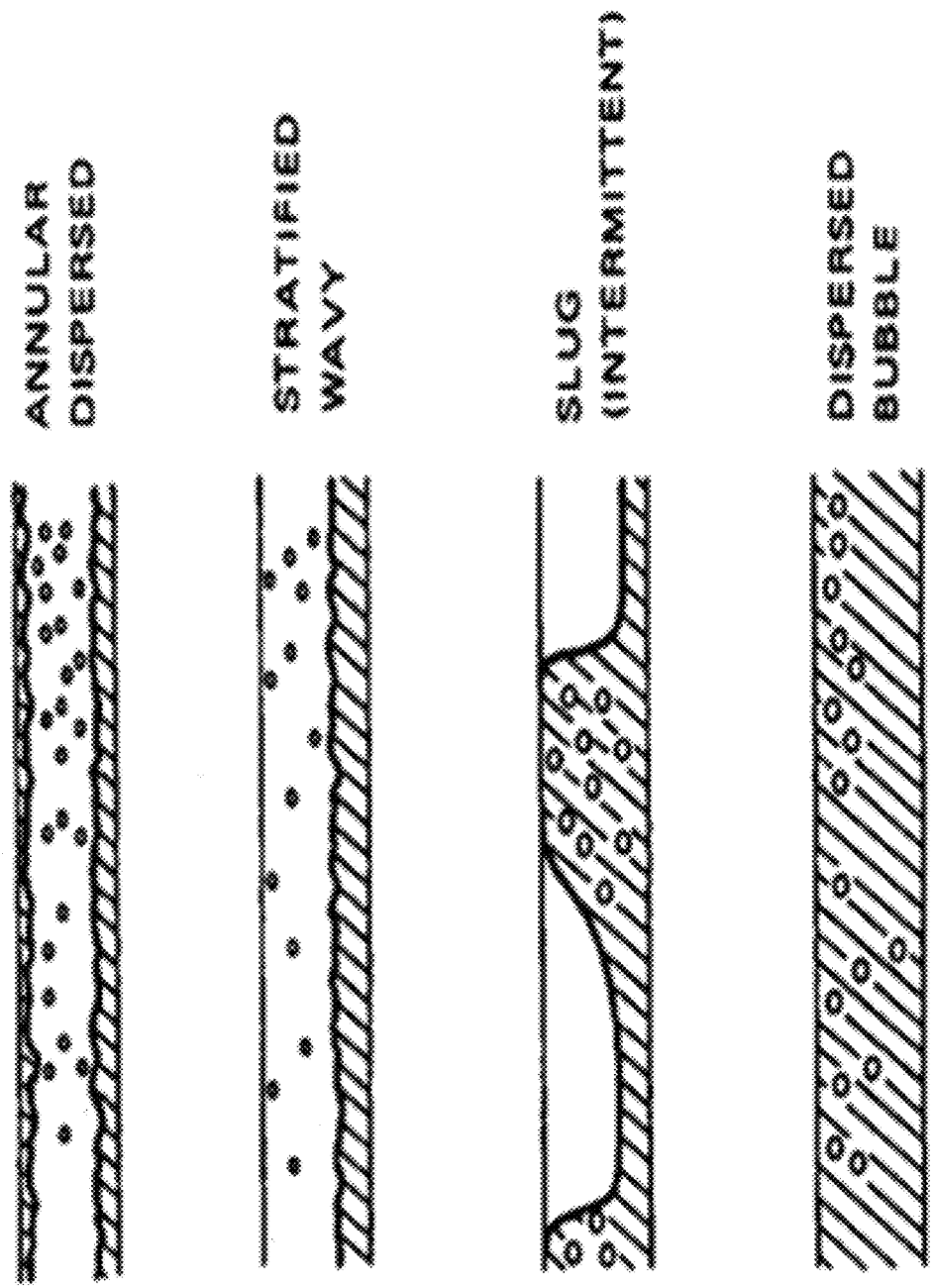
FIG. 11 illustrates example flow patterns in a horizontal two-phase flow, in accordance with aspects of the present disclosure.

FIG. 11 illustrates example flow patterns in a horizontal two-phase flow, in accordance with aspects of the present disclosure. The flow patterns in the horizontal two-phase flow can include annular dispersed, stratified wavy, slug (e.g., intermittent), and dispersed bubble.

In some examples, the flow regime can change: along the wellbore; over time, as production rates decrease due to natural depletion; over time, as production mix changes due to natural depletion; and over time, as pressure changes due to natural depletion (e.g., solution gas).

Figure 12:
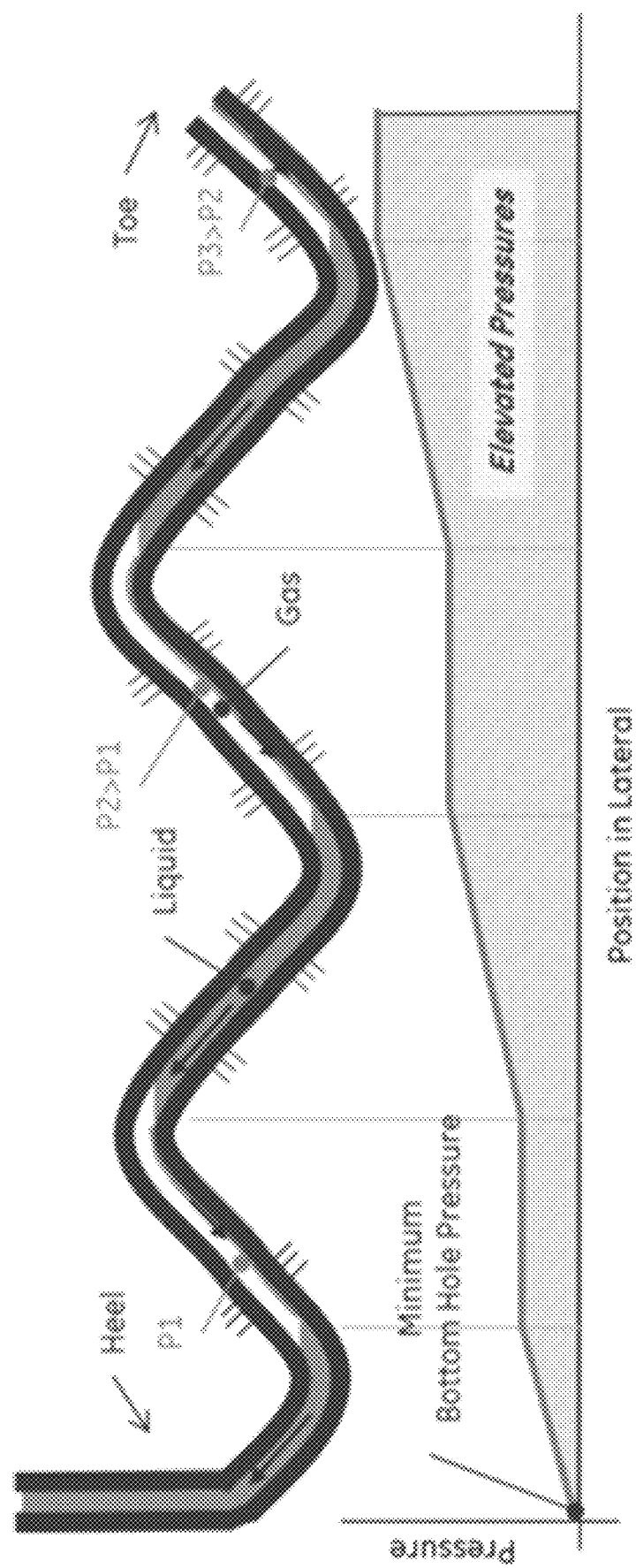
FIG. 12 illustrates an example of an undulating well, in accordance with aspects of the present disclosure.

FIG. 12 illustrates an example of an undulating well, in accordance with aspects of the present disclosure. Drilling is rarely performed in a perfectly straight line, there are natural undulations that occur during the drilling process. Directional drilling is also used to target predetermined areas in reservoir layers and sometimes even in different reservoir layers within the same well. As such, it can be difficult to replicate in-situ conditions. Flow loop test facilities are sometimes built in urban areas with traffic and environmental noise. Pumps, flow lines, and injection points can generate noise that varies with flow rate, phase composition, density, viscosity, etc.

Figure 13:
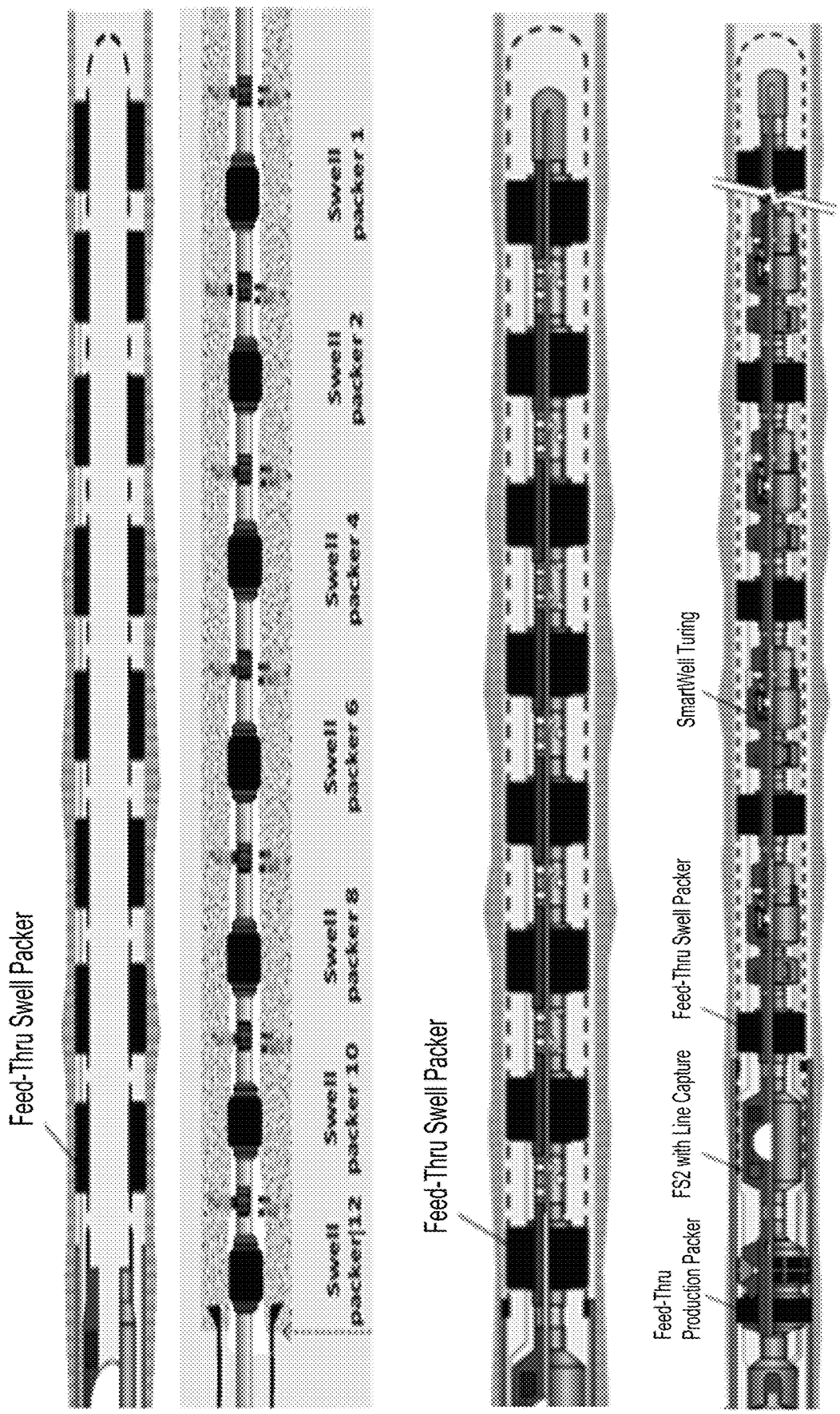
FIG. 13 illustrates a cross-sectional view of example wells including hardware, in accordance with aspects of the present disclosure.
Figure 14:
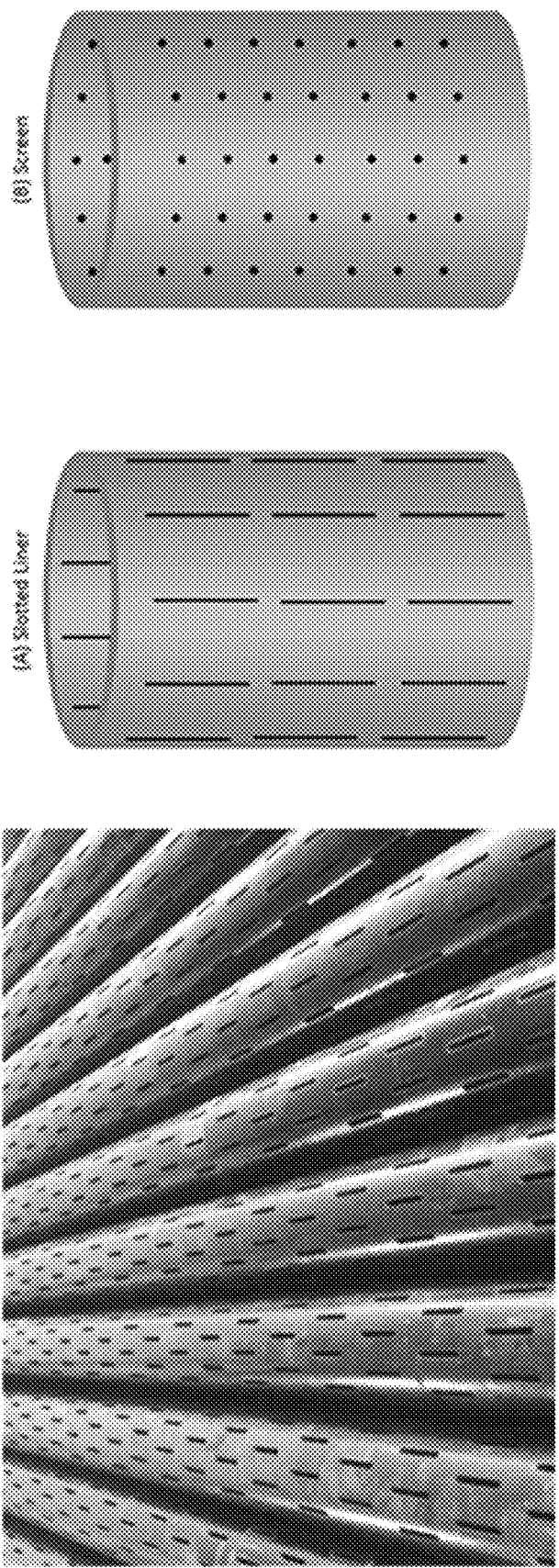
FIG. 14 illustrates example well liners, in accordance with aspects of the present disclosure.

FIG. 13 illustrates a cross-sectional view of example wells including hardware, in accordance with aspects of the present disclosure. FIG. 14 illustrates example well liners, in accordance with aspects of the present disclosure. Wells can be completed by utilizing different hardware such as swell packers, hydraulic set packers, Inflow Control Devices (ICDs), Inflow Control Valves (ICVs), perforated liners/screens/slotted lines/limited entry liners, etc. Different designs may also impact flow properties and measured data.

While a limited flow loop test setup can be used to simulate a specific well in order to build production flow models, actual conditions may render the production flow model inaccurate and become obsolete over the life of the well. As such, there is a need for an improved process for developing production flow models where the production flow model can be built in-situ and also be updated on demand.

Figure 15:
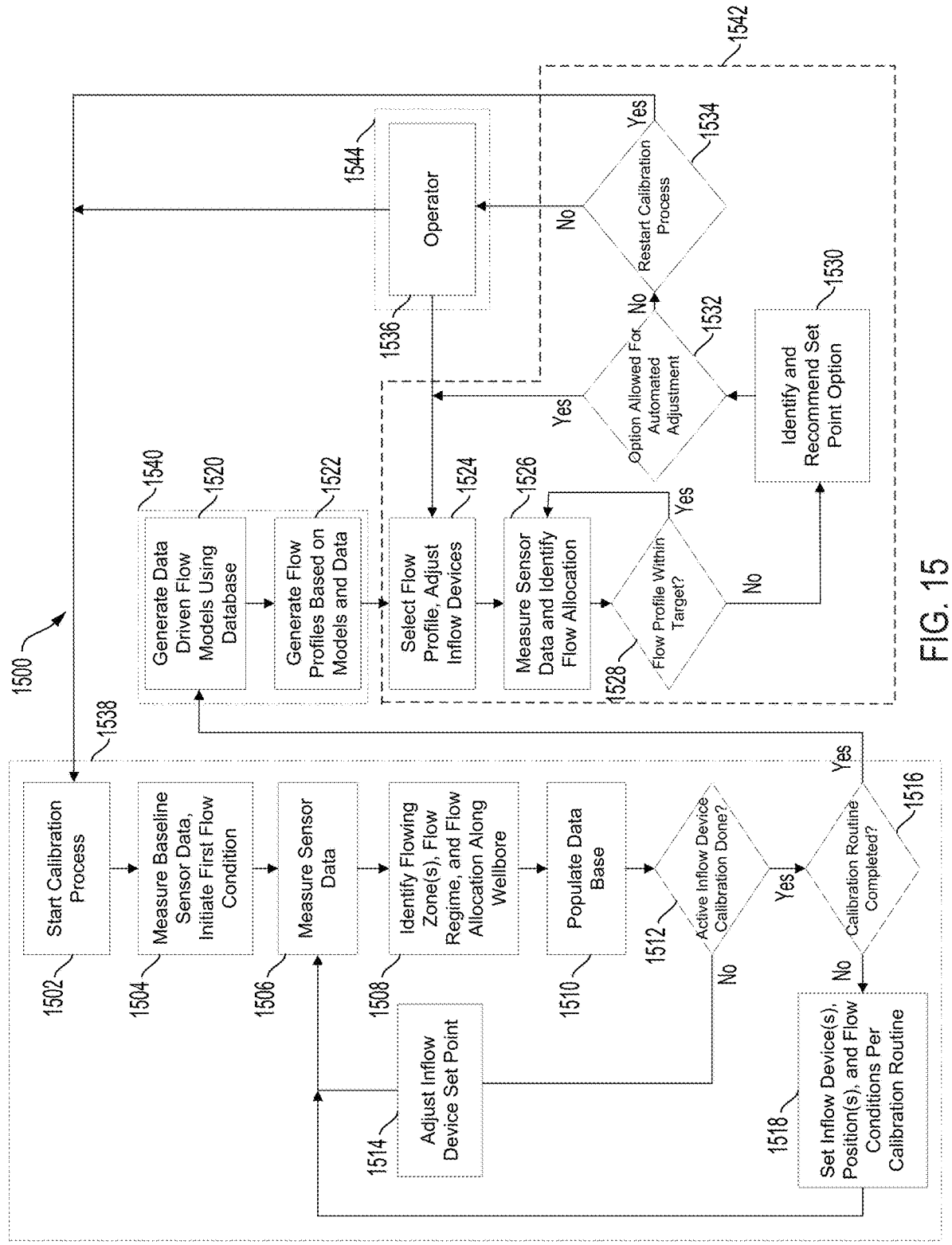
FIG. 15 illustrates an example flow chart for generating data driven models, in accordance with aspects of the present disclosure.

FIG. 15 illustrates an example flow chart of a process for generating data driven models 1500, in accordance with aspects of the present disclosure.

At step 1502, the process 1500 can include starting a calibration process.

At step 1504, the process 1500 can include measuring baseline sensor data and initiating a first flow condition.

At step 1506, the process 1500 can include measuring sensor data.

At step 1508, the process 1500 can include identifying zones, flow regimes, and flow allocation along a wellbore. Step 1508 of the process 1500 can also include using raw and/or processed sensor data, physical models, data driven models, previously identified signatures of events or conditions, correlations with surface measurements, or flow models generated through flow loop experiments.

At step 1510, the process 1500 can include populating a database.

At step 1512, the process 1500 can include determining whether an active inflow device calibration is complete. If not, the process 1500 can proceed to step 1514 for adjusting inflow device set points. If yes, the process 1500 can proceed to step 1516.

At step 1516, the process 1500 can include determining whether a calibration routine is complete. If not, the process 1500 can proceed to step 1518 for setting inflow devices, positions, and flow conditions per calibration routine. If yes, the process 1500 can proceed to step 1520.

At step 1520, the process 1500 can include generating data driven flow models using the database.

At step 1522, the process 1500 can include generating flow profiles based on the data driven flow models and data.

At step 1524, the process 1500 can include selecting a flow profile and adjusting inflow devices.

At step 1526, the process 1500 can include measuring sensor data and identifying flow allocation.

At step 1528, the process 1500 can include determining whether the flow profile is within a target range. If not, the process 1500 can proceed to step 1530 for identifying and recommending set point options. If yes, the process 1500 can proceed to step 1526 for measuring sensor data and identifying flow allocation.

At step 1532, the process 1500 can include determining whether an option is allowed for automated adjustment. If not, the process 1500 can proceed to step 1534 for restarting the calibration process. If yes, the process 1500 can proceed to step 1524 for selecting flow profiles and adjusting inflow devices.

At step 1534, the process 1500 can include determining whether to restart the calibration process. If not, the process 1500 can proceed to the step 1536 for awaiting operator action. If yes, the process 1500 can proceed to step 1502 and restart the calibration process.

In some implementations, the process 1500 can be a data driven approach to flow monitoring model in completions with zonal inflow control, where the completion can be equipped with distributed fiber optic sensing and pressure sensors. The process 1500 can be utilized for injection or production monitoring.

There are numerous challenges with building injection and production flow models. No two reservoirs or wells in a reservoir/formation are identical. Porosity, permeability, pore throat sizes, chemical composition, layers, faults, depths, temperatures, pressures, etc. all depend on how the reservoir was formed over time, which also varies based on location. Moreover, reservoirs deplete over time. As such, pressure, flow rates, and gas-oil-water ratios also change. Solution gas, gas oil interfaces, and oil water interfaces also move. Flow regimes can also change as the fluid composition changes over time and/or the distance changes along the wellbore. Flow regime can further change along the wellbore as the flow rate can be different between the toe of the well and the heel of the well.

In some implementations, the process 1500 can include utilizing a surface multi-phase flow metering system or similar systems for determining flow rates (e.g., step 1504 of FIG. 15). The process 1500 can further include utilizing a surface sensing system capable of sensing pressure, resistance, capacitance, etc. (e.g., step 1506 of FIG. 15). The process 1500 can also include utilizing a zonal inflow device control system capable of controlling inflow devices per production zone (e.g., steps 1512, 1514, 1516, 1518 of FIG. 15). Moreover, the process 1500 can include utilizing a subsurface sensing system such as a distributed fiber optic cable. The distributed fiber optic cable can be a DAS, DTS, strain, pressure sensor, etc., and can be associated with surface interrogation units.

In other implementations, the process 1500 can include: controlling a zonal inflow device control system per a predetermined sequence and/or controlling the zonal inflow device system to generate zonal inflow conditions based on rules and data coverage (e.g., step 1524 of FIG. 15), which can be determined based on measured/calculated response parameters by the data driven model (e.g., step 1520 of FIG. 15); collecting data from the inflow device control system, multi-phase flow metering system, surface and/or subsurface sensors (e.g., step 1526 of FIG. 15); and populating a database (e.g., step 1510 of FIG. 15) and building data driven models for flow allocation per production zone (e.g., step 1520 of FIG. 15). In some implementations, the zonal inflow device control system can communicate with the production flow monitoring system to select flow profiles or be assigned a preferred flow profile and adjust inflow devices according to the selected flow profile.

The process 1500 can control the inflow control devices and build up a matrix of controlled flow conditions, where flow characteristics can be identified for each zone (e.g., step 1508 of FIG. 15). The process 1500 can utilize surface flow metering and measure using subsurface sensors across a range of inflow device openings between 0% and 100% (e.g., step 1506 of FIG. 15). The process 1500 can then include adding flow contributions by opening up additional zones (e.g., step 1518 of FIG. 15), and generating a matrix of data that can be used to generate a production flow model for a specific well (e.g., step 1520 of FIG. 15).

The process 1500 includes the added benefit collecting data in the real environment where the sensing system is to be used. The environmental noise is also very low, while reservoir characteristics driving production rates are realistic. The hardware and flow orifices are also the actual devises used for the life of the well. The flow model can further be customized for a specific application. Furthermore, the flow model can be continuously updated based on measured data.

The steps of the process 1500 included in region 1538 can include generating data for the data driven models at step 1520. The steps of the process 1500 included in the region 1538 can generate a number of possible production scenarios that can be duplicated by changing the total flow rate at the surface or by changing down-hole flow control devices while collecting data. The steps of the process 1500 included in the region 1538 can further include randomizing the data (e.g., set points) such that that systematic errors may be minimized. For example, surface chokes and/or inflow control devices may have systematic errors when operated in one direction. As such, the process 1500 can include reducing these types of errors by systematically increasing or decreasing the settings versus only increasing the settings until all data points have been taken and then decreasing the settings until the device is closed.

The steps of the process 1500 included in region 1540 can include generating the data driven flow models. For example, the data received and determined in the steps of region 1538 can be utilized to generate relationships such as the data driven flow models at step 1520. The data driven flow models can be generated based on design parameters, inflow conditions, surface and subsurface measurements, and production output using machine learning (ML)/artificial intelligence (AI) algorithms. The process 1500 can further include utilizing supervised and unsupervised ML/AI algorithms to generate the data driven flow models.

Given the amount of data collected through utilizing the DAS/DTS fiber optic lines, surface and subsurface sensors may be significant. As such, unsupervised learning such as Principal Component Analysis (PCA) and Independent Component Analysis (ICA) can be used by the process 1500 to reduce dimensions to components, while explaining a high percentage of variance in the data. Furthermore, the process 1500 can include utilizing a clustering technique such as DB SCAN, Gaussian Mixture, K-means, etc., that can be used to cluster possible conditions to a subset of clusters with a homogenous behavior. The data in each cluster can then will be used by the process 1500 to develop a flow model specific for that particular cluster. Moreover, examining the distance between the clusters and the variables driving this distance can be used by the process 1500 as a control measure to move from a cluster with an undesired production profile to clusters with a higher/desirable production profile.

The process 1500 can further include utilizing autoencoder deep learning models (e.g., Long Short Term Memory (LSTM), Recurrent Neural Network (RNN), and Deep Neural Network (DNN) autoencoders) to reduce dimensionality. Furthermore, the autoencoder deep learning models can be used to detect anomalies during monitoring of the well.

In the supervised learning model, some parameters of production output (e.g., either univariate with a single output parameter or multivariate with multiple outputs such as oil, gas, and water production) can be used as a target while the design parameters, surface measurements, and subsurface measurements can be utilized as predictors. The supervised learning model can be established by employing time-series ML/AI algorithms such as RNN and LSTM. The supervised learning model can further be established on different aggregated levels using non-time-series ML/AI algorithms such as DNN, Randomforest, gradient boosting, etc. Furthermore, the data measured by the process 1500 can be utilized to generate the flow models to predict both surface output and contribution of each production intervals.

In some implementations, the supervised and unsupervised models can also be used as a generator of flow profiles under different conditions, as shown in step 1522 of FIG. 15. Furthermore, the supervised and unsupervised models can be used to estimate optimum conditions or desired outcomes by utilizing reverse optimization.

In other implementations, the steps of region 1540 can include utilizing reinforcement deep learning algorithms that can develop a control mechanism to optimized requirement specifications set by a customer or an operator 1536. In one example, the process 1500 can include utilizing a developed model as described herein that can provide a predetermined output (e.g., as a goal of a game) and a reinforcement learning algorithm to generate an input to the model, thereby learning how to achieve the highest award by reaching to the predetermined output. In another example, the process 1500 can include a flow loop (e.g., being game rules) and allow the algorithm to control the flow loop to achieve a set goal. In this example, the gathering of data and optimization can be performed simultaneously by the algorithm.

The steps of the process 1500 included in region 1542 can include providing real-time production automation. For example, at step 1532, a production target may include boundaries (e.g., an upper boundary and a lower boundary) where actual production may be allowed to vary in between. If average values deviate beyond these boundaries (e.g., increased water production from a zone), the production flow monitoring system can automatically reduce the flow contribution from the corresponding zone. The process 1500 can include utilizing various data driven approaches to predict production variation and change system settings in response to the corresponding predictions.

The steps of the process 1500 included in region 1544 can include providing exception handling and set point selection. For example, the operator 1536 may be an individual or a data driven input from a supervisory level system, where inputs from multiple wells in a field can be used to compute well and zone specific set points. In some examples, a zone or a number of zones may be tied to a specific reservoir layer in a particular field. Some wells may also be injecting water into the reservoir layer through injection wells, while other wells in the field may be producing hydrocarbons in the same field. The supervisory level system of the production flow monitoring system can monitor sweep efficiencies of the reservoir layers using 3D/4D seismic data. The seismic data may be collected by the DAS-based fiber optic systems and/or other seismic sensors. The supervisory system can also monitor reservoir level pressure with the intent of maintaining pressure at set levels to manage solution gas, gas, oil, and oil/water interfaces, and to manage naturally flowing wells. The measured data can be pressure in one or multiple wells, and the control lever can adjust water injection rates and pressures in one or multiple wells.

At step 1524, the process 1500 can further include being operated manually or automatically based on conditions. For example, depending on the scope of automation and what is exception-based, the step 1524 of process 1500 can include manual actions by the operator or automatic supervisory level expert system input.

Figure 16:
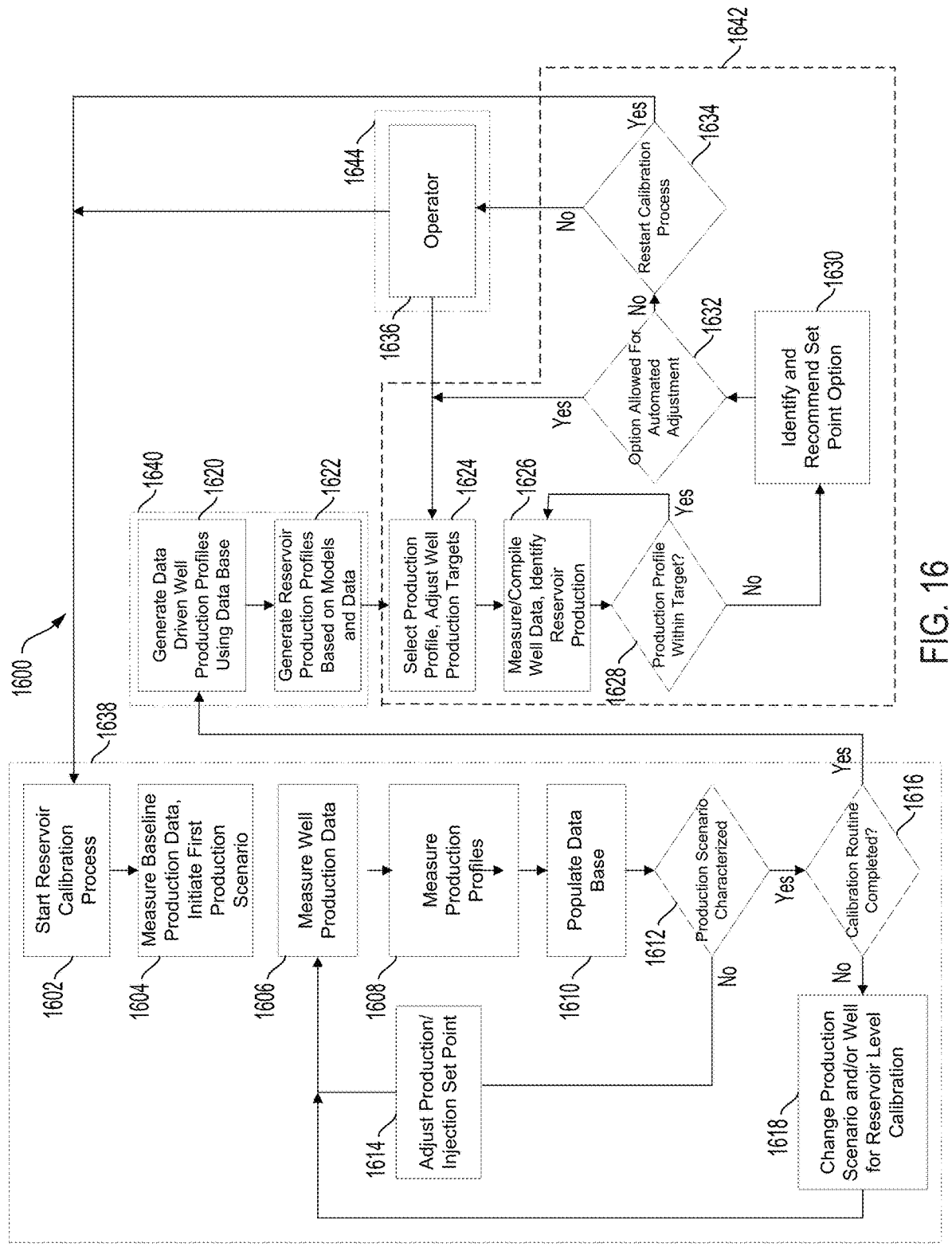
FIG. 16 illustrates an example flow chart of a process for utilizing a supervisory system, in accordance with aspects of the present disclosure.

FIG. 16 illustrates an example flow chart of a process for utilizing a supervisory system 1600, in accordance with aspects of the present disclosure. In some implementations, the supervisory process 1600 can be utilized at step 1536 of the process 1500 as shown in FIG. 15 for a single well or multiple wells. In other implementations, the supervisory process 1600 can be performed in conjunction with the process 1500, where communication between the supervisory system and the production flow monitoring system can be facilitated by code/communication software at step 1536 of the process 1500. The supervisory process 1600 for a reservoir level can be similar to the process 1500. However, a calibration process can apply to multiple wells in a reservoir instead of zones in a well. Regions 1640 and 1642, for the supervisory level, can apply to reservoir production models and reservoir production automation.

Referring to FIG. 16, the supervisory system of the supervisory process 1600 can generate a reservoir level model using similar approaches (e.g., as described in the production flow monitoring system of FIG. 15) for a well level. The reservoir supervisory system can control injection and production targets for wells, as well as for reservoir water flood sweep efficiency. Additional data such as reservoir, well specific Vertical Seismic Profiles (VSP), and seismic profiles can be received/measured using DAS systems/fibers that may be installed in the individual wells in order to monitor the progression of water flood efficiency.

At step 1602, the supervisory process 1600 can include starting a reservoir calibration process.

At step 1604, the supervisory process 1600 can include measuring baseline production data and initiating a first production scenario.

At step 1606, the supervisory process 1600 can include measuring well production data.

At step 1608, the supervisory process 1600 can include measuring production profiles.

At step 1610, the supervisory process 1600 can include populating a database.

At step 1612, the supervisory process 1600 can include determining a production scenario that is characterized. If not, the supervisory process 1600 can proceed to step 1614 for adjusting production/injection set points. If yes, the supervisory process 1600 can proceed to step 1616.

At step 1616, the supervisory process 1600 can include determining whether a calibration routine is complete. If not, the supervisory process 1600 can proceed to step 1618 for changing production scenarios and/or well for reservoir level calibration. If yes, the supervisory process 1600 can proceed to step 1620.

At step 1620, the supervisory process 1600 can include generating data driven well production profiles using the database.

At step 1622, the supervisory process 1600 can include generating reservoir production profiles based on the models and data.

At step 1624, the supervisory process 1600 can include selecting a production profile and adjusting well production targets (e.g., devices as described herein).

At step 1626, the supervisory process 1600 can include measuring or compiling well data and identifying reservoir production.

At step 1628, the supervisory process 1600 can include determining whether the production profile is within a target range. If not, the supervisory process 1600 can proceed to step 1630 for identifying and recommending set point options. If yes, the supervisory process 1600 can proceed to step 1626 for measuring or compiling well data and identifying reservoir production.

At step 1632, the supervisory process 1600 can include determining whether an option is allowed for automated adjustment. If not, the supervisory process 1600 can proceed to step 1634 for restarting the calibration process. If yes, the supervisory process 1600 can proceed to step 1624 for selecting a production profile and adjusting well production targets (e.g., devices as described herein).

At step 1634, the supervisory process 1600 can include determining whether to restart the calibration process. If not, the supervisory process 1600 can proceed to the step 1636 for awaiting operator action. If yes, the supervisory process 1600 can proceed to step 1602 and restart the reservoir calibration process.

Regions 1638, 1640, 1642 of the supervisory process 1600 can be similar to regions 1538, 1540, 1542 of the process 1500, respectively.

Figure 17:
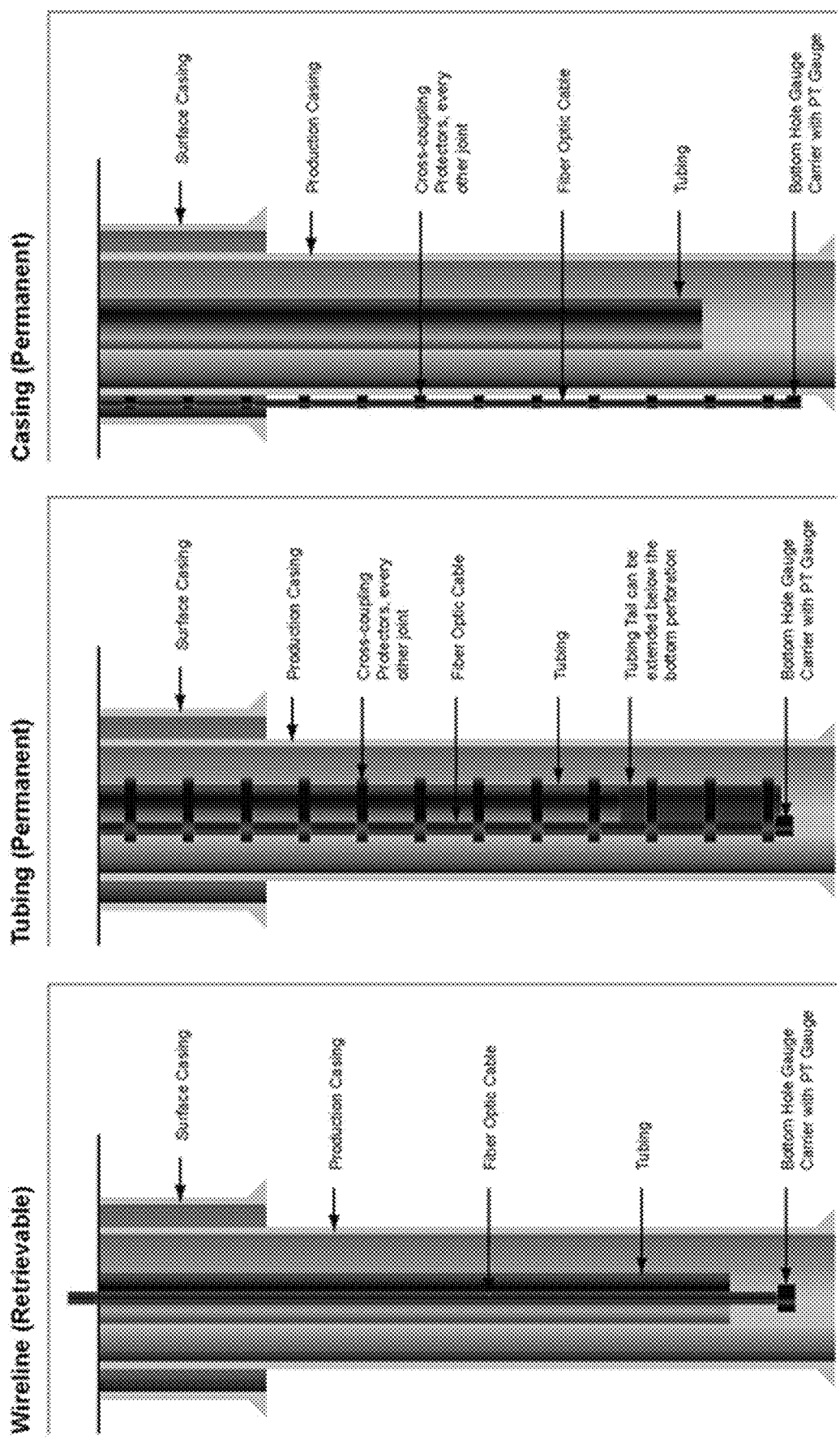
FIG. 17 illustrates example fiber optic sensing arrangements, in accordance with aspects of the present disclosure.

FIG. 17 illustrates example fiber optic sensing arrangements, in accordance with aspects of the present disclosure. For example, fiber optic sensing can be used for various sensing applications in the oil and gas industry. The production flow monitoring system as described herein can utilize Distributed Fiber Optic (DFOS) sensing systems and single/multipoint sensors.

Referring to FIG. 17, three types of fiber optic sensing arrangements are shown: 1) wireline (retrievable), tubing (permanent), and casing (permanent).

Permanently installed sensors may include fiber optic cables cemented in place in the annular space between the casing and the formation. The fiber optic cables may be clamped to the outside of the casing during deployment and protected by centralizers and cross coupling clamps during Run-In-Hole (RIH). Some examples include utilizing tubing conveyed cables, retrievable sensing cables such as wireline and slickline, or cables that are deployed inside a coiled tubing. Fiber optic cables can also be deployed in wells using gravity where a weight or conveyance vehicle can be dropped into a wellbore, where the fiber is then released into the well as the deployment vehicle moves down the wellbore. The optical fiber may be paid out from the surface or from a coil in the deployment vehicle. Gravity-based deployment vehicles may also be utilized when pumping into horizontal well bores.

Other types of fiber optic sensors may include point sensors either at the surface or downhole. Single point or multi-point pressure and temperature sensors may be used in reservoir monitoring applications, where the pressure sensors may be capable of collecting data at rates up to 2,000 Hz or even higher.

The fiber optic cables may also house one or several optical fibers. The optical fibers can also include single mode fibers, multi-mode fibers, or a combination of single mode and multi-mode optical fibers. The fiber optic sensing systems connected to the optical fibers can include Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

The fiber optic sensing systems can operate using various sensing principles such as Rayleigh scattering, Brillouin scattering, Raman scattering including but not limited to amplitude-based sensing systems such as DTS systems based on Raman scattering, phase sensing based systems such as DAS systems based on interferometric sensing using homodyne or heterodyne techniques where the system may sense phase or intensity changes due to constructive or destructive interference, strain sensing systems such as DSS using dynamic strain measurements based on interferometric sensors or static strain sensing measurements using, for example, Brillouin scattering, quasi-distributed sensors based on Fiber Bragg Gratings (FBGs) where a wavelength shift can be detected or multiple FBGs are used to form Fabry-Perot type interferometric sensors for phase or intensity based sensing, or single point fiber optic sensors based on Fabry-Perot, FBG, or intensity-based sensors.

True Distributed Fiber Optic Sensing (DFOS) systems can also be utilized and based on Optical Time Domain Reflectometry (OTDR) principles or Optical Frequency Domain Reflectometry (OFDR). OTDR-based systems are pulsed where one or more optical pulses can be transmitted down an optical fiber and backscattered light (e.g., Rayleigh, Brillouin, Raman, etc.) is measured and processed. Time of flight for the optical pulses can indicate where along the optical fiber the measurement is performed. OFDR-based systems can operate in continuous wave (CW) mode where a tunable laser is swept across a wavelength range, and the back scattered light is collected and processed.

Various hybrid approaches can also include single point, quasi-distributed, or a combination of distributed fiber optic sensors such as electrical sensors. The fiber optic cable can also include optical fibers and electrical conductors. Electrical sensors can include pressure sensors based on quarts type sensors, strain gauge based sensors, or any other sensing technology suitable for the intended purpose and understood by a person of ordinary skill in the art. Pressure sensors, optical or electrical, can be housed in dedicated gauge mandrels, attached outside the casing in various configurations for down-hole deployment, or deployed at the surface well head or flow lines.

Temperature measurements received from a DTS system can be used to determine locations for water injection applications where fluid inflow in the treatment well, as well as the fluids from the surface, are likely to be cooler than formation temperatures. DTS warm-back analyses can determine fluid volume placement. This can be performed for water injection wells and fracturing fluid placement. Temperature measurements in observation wells can be used to determine fluid communication between the treatment well and the observation well, or to determine formation fluid movement.

DAS data can be used to determine fluid allocation in real-time as acoustic noise is generated when fluid flows through the casing and in through perforations into the formation. Phase and intensity based interferometric sensing systems are sensitive to temperature and mechanical, as well as acoustically induced vibrations. DAS data can be converted from time series data to frequency domain data using Fast Fourier Transforms (FFT) and other transforms (e.g., wavelet transforms can be utilized to generate different representations of the data). Various frequency ranges can be used for different purposes. Low frequency signal changes can be attributed to formation strain changes. Temperature changes can be due to fluid movement. Other frequency ranges can also be indicative of fluid or gas movement. Various filtering techniques and models can be applied to generate indicators of events that may be of interest. Indicators can include formation movement due to growing natural fractures, formation stress changes during the fracturing operations (e.g., stress shadowing), fluid seepage during the fracturing operation as formation movement can force fluid into an observation well that can be detected, fluid flow from fractures, and fluid and proppant flow from fracture hits. Each indicator can have a characteristic signature in terms of frequency content, amplitude, and/or time dependent behavior. These indicators can also be present at other data types and not limited to DAS data. Fiber optic cables used with DAS systems can include enhanced back scatter optical fibers where the Rayleigh backscatter can be increased by $10x$ or more with associated increases in Optical Signal to Noise Ratio (OSNR).

DAS systems can also be used to detect various seismic events where stress fields and growing fracture networks generate microseimic events or where perforation charge events may be used to determine travel time between horizontal wells. The detected data can also be used stage-to-stage to determine changes in travel time as the formation is fractured and filled with fluid and proppant. The DAS systems can also be used with surface seismic sources to generate Vertical Seismic Profiles (VSPs) before, during, and after a fracturing job to determine the effectiveness of the fracturing job as well as to determine production effectiveness. VSPs and reflection seismic surveys can be used over the life of a well or reservoir to track production related depletion and water, gas, and polymer flood fronts.

DSS data can be generated using various approaches. For example, static strain data can be used to determine absolute strain changes over time. Static strain data can be measured using Brillouin-based systems or quasi-distributed strain data from a FBG-based system. Static strain can also be used to determine propped fracture volume by looking at deviations in strain data from a measured strain baseline before fracturing a stage. Formation properties such as permeability, poroelastic responses, and leak off rates can be determined based on the change of strain versus time and the rate at which the strain changes over time. Dynamic strain data can be used in real-time to detect fracture growth through a corresponding inversion model and appropriate actions such as dynamic changes to fluid flow rates in the treatment well. Additional diverters or chemicals into the fracturing fluid, or changes to proppant concentrations or types can then be used to mitigate detrimental effects.

Fiber Bragg Grating based systems can also be used for a number of different measurements. FBGs can include partial reflectors that can be used as temperature and strain sensors, or can be used to make various interferometric sensors with very high sensitivity. FBGs can also be used to make point sensors or quasi-distributed sensors where FBG-based sensors can be used independently or with other types of fiber optic based sensors. FBGs can be manufactured into an optical fiber at a specific wavelength and other system such as DAS, DSS, or DTS systems, which may operate at different wavelengths in the same fiber and measure different parameters simultaneously as FBG-based systems use Wavelength Division Multiplexing (WDM) and/or Time Division Multiplexing (TDM).

In some implementations, the sensors can be positioned in either the injection wells or the production wells to measure reservoir level data of interest. For hydraulic fracturing wells, this can include treatment well pressure, rate, proppant concentration, diverters, fluids, and chemicals that may be altered to change the hydraulic fracturing treatment. These changes may impact the formation responses in several different ways such as changing stress fields. This may generate microseismic effects that can be measured with the DAS systems and the single point seismic sensors such as geophones. Fracture growth rates can change and this can generate changes in measured microseismic events and event distributions over time, or changes in measured strain using the low frequency portion, the DAS signal, or Brillouin-based sensing systems. Pressure changes can also be due to poroelastic effects that can be measured in the monitoring well. Pressure data can be measured in the treatment well and correlated to formation responses. Various changes in treatment rates and pressure may generate events that can be correlated to fracture growth rates.

All of the technologies and measurements outlined herein can be used for reservoir measurements in injection and production wells.

Several measurements can also be combined to determine adjacent well communication, and these measurements can further be used to change a hydraulic fracturing treatment schedule to generate desired outcomes. Multiple wells in a field or reservoir may include optical fibers for monitoring subsurface reservoirs from cradle to grave. Subsurface applications can include hydrocarbon extraction, geothermal energy production, and fluid injection such as water or $CO_2$ in carbon capture, utilization, and storage (CCUS) applications.

Figure 18:
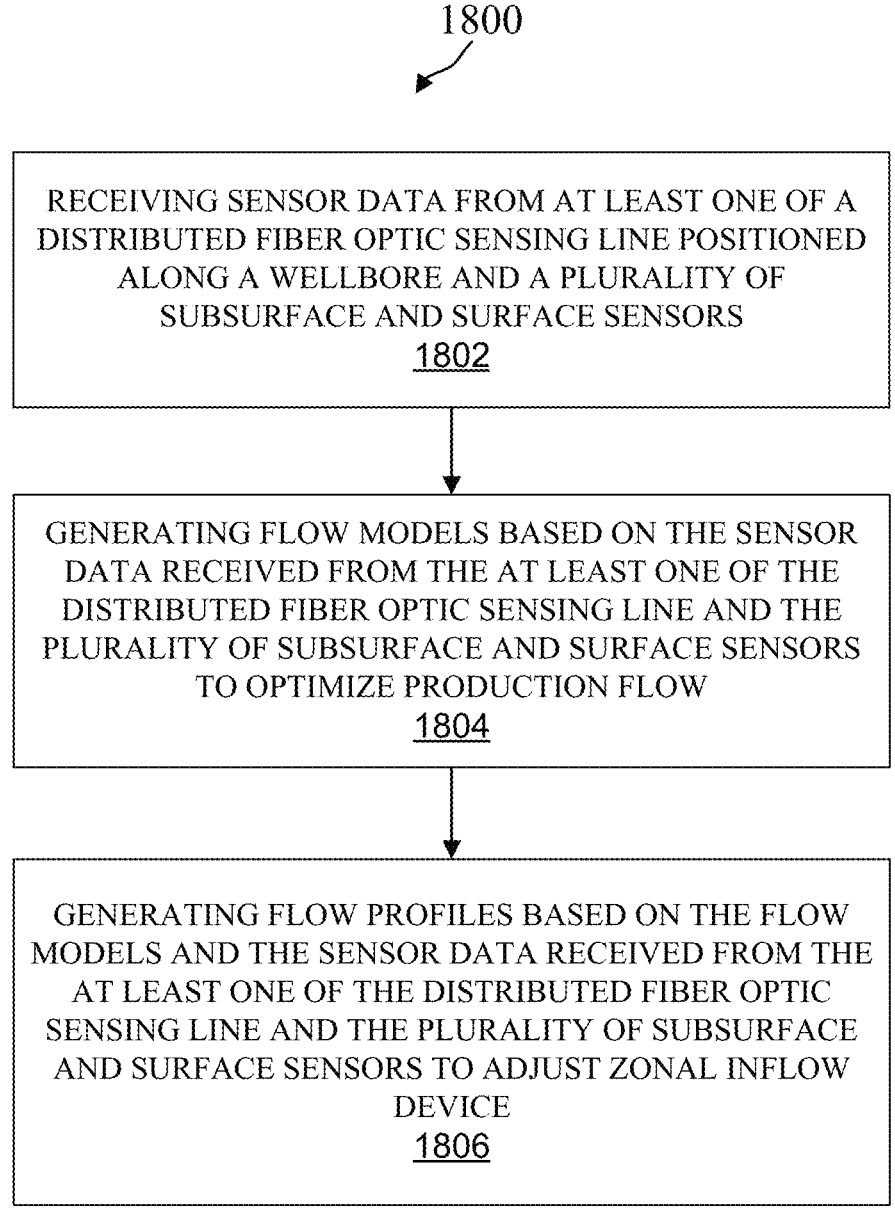
FIG. 18 shows an example process for generating data driven models, in accordance with aspects of the present disclosure.

Having disclosed some example system components and concepts, the disclosure now turns to FIG. 18, which illustrate example method 1800 for optimizing production flow monitoring by utilizing data driven in-situ injection. The steps outlined herein are exemplary and can be implemented in any combination thereof, including combinations that exclude, add, or modify certain steps.

At step 1802, the method 1800 can include receiving sensor data from at least one of a distributed fiber optic sensing line positioned along a wellbore and a plurality of subsurface and surface sensors. The sensor data can include at least one of pressure data, strain data, resistance data, acoustic data, temperature data, vibration data, and capacitance data.

At step 1804, the method 1800 can include generating flow models based on the sensor data received from the at least one of the distributed fiber optic sensing line and the plurality of subsurface and surface sensors to optimize production flow.

At step 1806, the method 1800 can include generating flow profiles based on the flow models and the sensor data received from the at least one of the distributed fiber optic sensing line and the plurality of subsurface and surface sensors to adjust zonal inflow device.

The method 1800 can further include generating a matrix of controlled flow conditions including flow characteristics of each zone of the wellbore.

The method 1800 can also include identifying at least one of flow zones, flow regimes, or flow allocation along the wellbore. The generating of the flow models can be further based on the at least one of the flow zones, the flow regimes, or the flow allocation along the wellbore.

The method 1800 can additionally include controlling the zonal inflow device to generate zonal inflow conditions based on the flow profiles.

The method 1800 can further include determining whether the flow profiles are within a target range, identifying a set point option based on the determining of whether the flow profiles are within the target range, and adjusting the zonal inflow device automatically based on the identified set point option.

Figure 19:
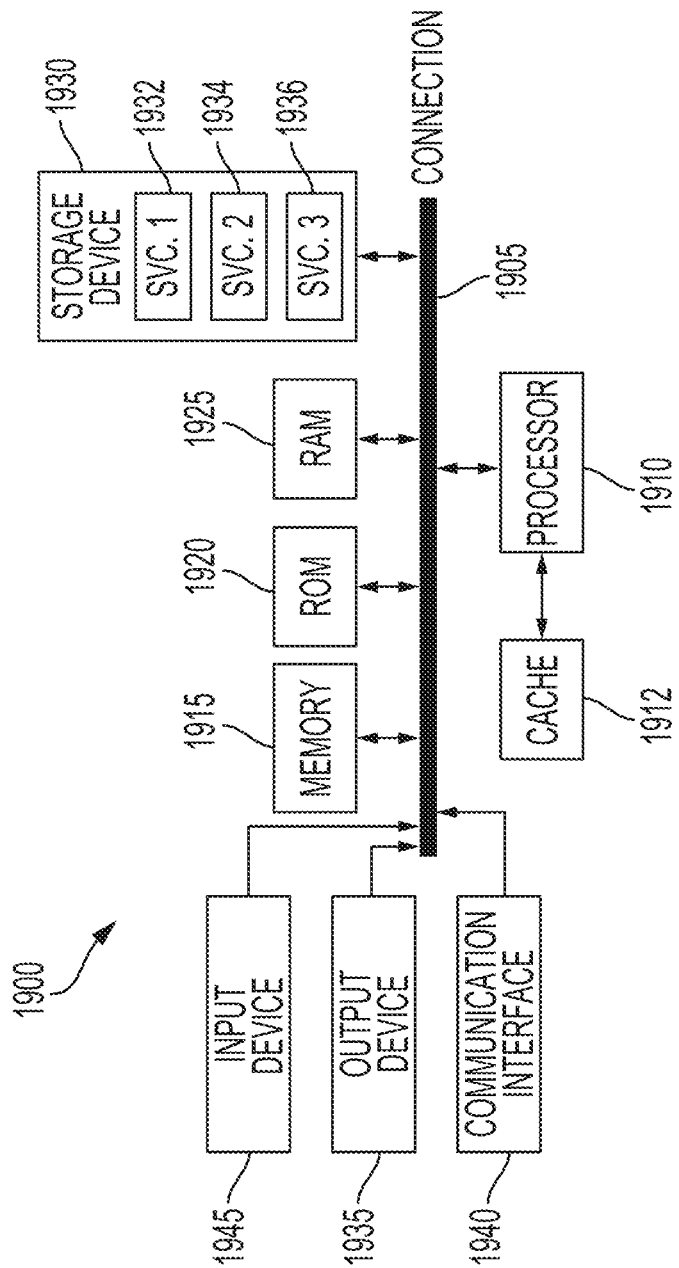
FIG. 19 illustrates an example computing device architecture that can be employed to perform various steps, methods, and techniques disclosed herein.

FIG. 19 illustrates an example computing device architecture 1900, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 19 illustrates an example computing device architecture 1900 of a computing device, which can implement the various technologies and techniques described herein. The components of the computing device architecture 1900 are shown in electrical communication with each other using a connection 1905, such as a bus. The example computing device architecture 1900 includes a processing unit (CPU or processor) 1910 and a computing device connection 1905 that couples various computing device components including the computing device memory 1915, such as read only memory (ROM) 1920 and random access memory (RAM) 1925, to the processor 1910.

The computing device architecture 1900 can include a cache of high-speed memory connected directly with, in close proximity to, or integrated as part of the processor 1910. The computing device architecture 1900 can copy data from the memory 1915 and/or the storage device 1930 to the cache 1912 for quick access by the processor 1910. In this way, the cache can provide a performance boost that avoids processor 1910 delays while waiting for data. These and other modules can control or be configured to control the processor 1910 to perform various actions. Other computing device memory 1915 may be available for use as well. The memory 1915 can include multiple different types of memory with different performance characteristics. The processor 1910 can include any general purpose processor and a hardware or software service, such as service 1 1932, service 2 1934, and service 3 1936 stored in storage device 1930, configured to control the processor 1910 as well as a special-purpose processor where software instructions are incorporated into the processor design. The processor 1910 may be a self-contained system, containing multiple cores or processors, a bus, memory controller, cache, etc. A multi-core processor may be symmetric or asymmetric.

To enable user interaction with the computing device architecture 1900, an input device 1945 can represent any number of input mechanisms, such as a microphone for speech, a touch-sensitive screen for gesture or grail input, keyboard, mouse, motion input, speech and so forth. An output device 1935 can also be one or more of a number of output mechanisms known to those of skill in the art, such as a display, projector, television, speaker device, etc. In some instances, multimodal computing devices can enable a user to provide multiple types of input to communicate with the computing device architecture 1900. The communications interface 1940 can generally govern and manage the user input and computing device output. There is no restriction on operating on any particular hardware arrangement and therefore the basic features here may easily be substituted for improved hardware or firmware arrangements as they are developed.

Storage device 1930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1925, read only memory (ROM) 1920, and hybrids thereof. The storage device 1930 can include services 1932, 1934, 1936 for controlling the processor 1910. Other hardware or software modules are contemplated. The storage device 1930 can be connected to the computing device connection 1905. In one aspect, a hardware module that performs a particular function can include the software component stored in a computer-readable medium in connection with the necessary hardware components, such as the processor 1910, connection 1905, output device 1935, and so forth, to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data, which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof)

through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising: receiving sensor data from at least one of a distributed fiber optic sensing line positioned along a wellbore and a plurality of subsurface and surface sensors; generating flow models based on the sensor data received from the at least one of the distributed fiber optic sensing line and the plurality of subsurface and surface sensors to optimize production flow; and generating flow profiles based on the flow models and the sensor data received from the at least one of the distributed fiber optic sensing line and the plurality of subsurface and surface sensors to adjust zonal inflow device.

Statement 2: The method of Statement 1, wherein the sensor data includes at least one of pressure data, strain data, resistance data, acoustic data, temperature data, vibration data, and capacitance data.

Statement 3: The method of any of Statements 1 to 2, further comprising generating a matrix of controlled flow conditions including flow characteristics of each zone of the wellbore.

Statement 4: The method of any of Statements 1 to 3, further comprising identifying at least one of flow zones, flow regimes, or flow allocation along the wellbore.

Statement 5: The method of any of Statements 1 to 4, wherein the generating of the flow models is further based on the at least one of the flow zones, the flow regimes, or the flow allocation along the wellbore.

Statement 6: The method of any of Statements 1 to 5, further comprising controlling the zonal inflow device to generate zonal inflow conditions based on the flow profiles.

Statement 7: The method of any of Statements 1 to 6, further comprising: determining whether the flow profiles are within a target range; identifying a set point option based on the determining of whether the flow profiles are within the target range; and adjusting the zonal inflow device automatically based on the identified set point option.

Statement 8: A system comprising: one or more processors; and at least one computer-readable storage medium having stored therein instructions which, when executed by the one or more processors, cause the system to: receive sensor data from at least one of a distributed fiber optic sensing line positioned along a wellbore and a plurality of subsurface and surface sensors; generate flow models based on the sensor data received from the at least one of the distributed fiber optic sensing line and the plurality of subsurface and surface sensors to optimize production flow; and generate flow profiles based on the flow models and the sensor data received from the at least one of the distributed fiber optic sensing line and the plurality of subsurface and surface sensors to adjust zonal inflow device.

Statement 9: The system of Statement 8, wherein the sensor data includes at least one of pressure data, strain data, resistance data, acoustic data, temperature data, vibration data, and capacitance data.

Statement 10: The system of any of Statements 8 to 9, wherein the instructions, when executed by the one or more processors, further cause the system to generate a matrix of controlled flow conditions including flow characteristics of each zone of the wellbore.

Statement 11: The system of any of Statements 8 to 10, wherein the instructions, when executed by the one or more processors, further cause the system to identify at least one of flow zones, flow regimes, or flow allocation along the wellbore.

Statement 12: The system of any of Statements 8 to 11, wherein the generation of the flow models is further based on the at least one of the flow zones, the flow regimes, or the flow allocation along the wellbore.

Statement 13: The system of any of Statements 8 to 12, wherein the instructions, when executed by the one or more processors, further cause the system to control the zonal inflow device to generate zonal inflow conditions based on the flow profiles.

Statement 14: The system of any of Statements 8 to 13, wherein the instructions, when executed by the one or more processors, further cause the system to: determine whether the flow profiles are within a target range; identify a set point option based on the determination of whether the flow profiles are within the target range; and adjust the zonal inflow device automatically based on the identified set point option.

Statement 15: A non-transitory computer-readable storage medium comprising: instructions stored on the non-transitory computer-readable storage medium, the instructions, when executed by one or more processors, cause the one or more processors to: receive sensor data from at least one of a distributed fiber optic sensing line positioned along a wellbore and a plurality of subsurface and surface sensors; generate flow models based on the sensor data received from the at least one of the distributed fiber optic sensing line and the plurality of subsurface and surface sensors to optimize production flow; and generate flow profiles based on the flow models and the sensor data received from the at least one of the distributed fiber optic sensing line and the plurality of subsurface and surface sensors to adjust zonal inflow device.

Statement 16: The non-transitory computer-readable storage medium of Statement 15, wherein the instructions, when executed by the one or more processors, further cause the one or more processors to generate a matrix of controlled flow conditions including flow characteristics of each zone of the wellbore.

Statement 17: The non-transitory computer-readable storage medium of any of Statements 15 to 16, wherein the instructions, when executed by the one or more processors, further cause the one or more processors to identify at least one of flow zones, flow regimes, or flow allocation along the wellbore.

Statement 18: The non-transitory computer-readable storage medium of any of Statements 15 to 17, wherein the generation of the flow models is further based on the at least one of the flow zones, the flow regimes, or the flow allocation along the wellbore.

Statement 19: The non-transitory computer-readable storage medium of any of Statements 15 to 18, wherein the instructions, when executed by the one or more processors, further cause the one or more processors to control the zonal inflow device to generate zonal inflow conditions based on the flow profiles.

Statement 20: The non-transitory computer-readable storage medium of any of Statements 15 to 19, wherein the instructions, when executed by the one or more processors, further cause the one or more processors to: determine whether the flow profiles are within a target range; identify a set point option based on the determination of whether the flow profiles are within the target range; and adjust the zonal inflow device automatically based on the identified set point option.

What is claimed is:

1. A method comprising:
   receiving sensor data from at least one of a distributed fiber optic sensing line positioned along a wellbore and a plurality of sensors, the plurality of sensors comprising one or more subsurface sensors and one or more surface sensors;
   generating a matrix of controlled flow conditions, the controlled flow conditions comprising flow contributions of each zone of a plurality of zones of the wellbore;
   identifying flow characteristics of each zone of the plurality of zones of the wellbore based on the matrix of controlled flow conditions;
   generating flow models based on the sensor data and the flow characteristics of each zone of the plurality of zones of the wellbore;
   generating flow profiles based on the flow models and the sensor data;
   controlling a zonal flow control device to generate zonal flow conditions based on the flow profiles;
   determining whether the flow profiles are within a target range;
   identifying a set point option based on the determining whether the flow profiles are within the target range;
   adjusting the zonal flow control device automatically based on the identified set point option; and
   iteratively adjusting one or more set points of the zonal flow control device in one or more zones of the wellbore until a difference between a first parameter associated with an iteration and a second parameter associated with the iteration reaches or is below a threshold, wherein the first parameter comprises a measurement of the sensor data and the second parameter comprises a calculated parameter, and wherein the iterative adjustments are based on:
      a determination that a production profile corresponds to a production target, and measuring, at each iteration, well data associated with the wellbore.

2. The method of claim 1, further comprising controlling the flow contributions associated with the matrix of controlled flow conditions via at least one of flow metering and adjusting at least one of the zonal flow control device and one or more zonal inflow devices.

3. The method of claim 1, further comprising generating, based on the sensor data, the flow models using one or more machine learning models.

4. The method of claim 1, further comprising identifying at least one of flow zones, flow regimes, or flow allocation along the wellbore, wherein the generating of the flow models is further based on the at least one of the flow zones, the flow regimes, or the flow allocation along the wellbore.

5. The method of claim 1, further comprising:
   generating clusters of flow conditions, each cluster being associated with one or more behaviors; and
   generating, for a particular cluster from the clusters, a cluster-specific flow model.

6. The method of claim 1, wherein the sensor data includes at least one of temperature data and acoustic data.

7. The method of claim 1, further comprising:
   performing a number of the iterative adjustments to reduce a misfit between measured and simulated temperature traces by adjusting production in the plurality of zones of the wellbore.

8. A system comprising:
   one or more processors; and
   at least one computer-readable storage medium having stored therein instructions which, when executed by the one or more processors, cause the system to:
      receive sensor data from at least one of a distributed fiber optic sensing line positioned along a wellbore and a plurality of sensors, the plurality of sensors comprising one or more subsurface sensors and one or more surface sensors;
      generate a matrix of controlled flow conditions, the controlled flow conditions comprising flow contributions of each zone of a plurality of zones of the wellbore;
      identify flow characteristics of each zone of the plurality of zones of the wellbore based on the matrix of controlled flow conditions;
      generate flow models based on the sensor data and the flow characteristics of each zone of the plurality of zones of the wellbore;

generate flow profiles based on the flow models and the sensor data;

control a zonal flow control device to generate zonal flow conditions based on the flow profiles;

determine whether the flow profiles are within a target range;

identify a set point option based on the determining whether the flow profiles are within the target range;

adjust the zonal flow control device automatically based on the identified set point option; and iteratively adjust one or more set points of the zonal flow control device in one or more zones of the wellbore one or more zones of the wellbore until a difference between a first parameter associated with an iteration and a second parameter associated with the iteration reaches or is below a threshold, wherein the first parameter comprises a measurement of the sensor data and the second parameter comprises a calculated parameter, and wherein the iterative adjustments are based on:

a determination that a production profile corresponds to a production target, and measuring, at each iteration, well data associated with the wellbore.

9. The system of claim 8, wherein the sensor data includes at least one of pressure data, strain data, resistance data, acoustic data, temperature data, vibration data, and capacitance data.

10. The system of claim 8, wherein the instructions, when executed by the one or more processors, further cause the system to generate, based on the sensor data, the flow models using one or more machine learning models.

11. The system of claim 8, wherein the instructions, when executed by the one or more processors, further cause the system to identify at least one of flow zones, flow regimes, or flow allocation along the wellbore, wherein the generating of the flow models is further based on the at least one of the flow zones, the flow regimes, or the flow allocation along the wellbore.

12. The system of claim 8, wherein the instructions, when executed by the one or more processors, further cause the system to:

generate clusters of flow conditions, each cluster being associated with one or more behaviors; and generate, for a particular cluster from the clusters, a cluster-specific flow model.

13. The system of claim 8, wherein the sensor data includes at least one of temperature data and acoustic data.

14. The system of claim 8, wherein the execution of the instructions by the one or more processors cause the system to:

perform a number of the iterative adjustments to reduce a misfit between measured and simulated temperature traces by adjusting production in the plurality of zones of the wellbore.

15. A non-transitory computer-readable storage medium comprising:

instructions stored on the non-transitory computer-readable storage medium, the instructions, when executed by one or more processors, cause the one or more processors to:

receive sensor data from at least one of a distributed fiber optic sensing line positioned along a wellbore and a plurality of sensors, the plurality of sensors comprising one or more subsurface sensors and one or more surface sensors;

generate a matrix of controlled flow conditions, the controlled flow conditions comprising flow contributions of each zone of a plurality of zones of the wellbore;

identify flow characteristics of each zone of the plurality of zones of the wellbore based on the matrix of controlled flow conditions;

generate flow models based on the sensor data and the flow characteristics of each zone of the plurality of zones of the wellbore;

generate flow profiles based on the flow models and the sensor data;

control a zonal flow control device to generate zonal flow conditions based on the flow profiles;

determine whether the flow profiles are within a target range;

identify a set point option based on the determining whether the flow profiles are within the target range;

adjust the zonal flow control device automatically based on the identified set point option; and iteratively adjust one or more set points of the zonal flow control device in one or more zones of the wellbore until a difference between a first parameter associated with an iteration and a second parameter associated with the iteration reaches or is below a threshold, wherein the first parameter comprises a measurement of the sensor data and the second parameter comprises a calculated parameter, and wherein the iterative adjustments are based on:

a determination that a production profile corresponds to a production target, and measuring, at each iteration, well data associated with the wellbore.

16. The non-transitory computer-readable storage medium of claim 15, wherein the instructions, when executed by the one or more processors, further cause the one or more processors to generate, based on the sensor data, the flow models using one or more machine learning models.

17. The non-transitory computer-readable storage medium of claim 15, wherein the instructions, when executed by the one or more processors, further cause the one or more processors to identify at least one of flow zones, flow regimes, or flow allocation along the wellbore, wherein the generating of the flow models is further based on the at least one of the flow zones, the flow regimes, or the flow allocation along the wellbore.

18. The non-transitory computer-readable storage medium of claim 15, wherein the instructions, when executed by the one or more processors, further cause the one or more processors to:

generate clusters of flow conditions, each cluster being associated with one or more behaviors; and generate, for a particular cluster from the clusters, a cluster-specific flow model.

19. The non-transitory computer-readable storage medium of claim 15, wherein the sensor data includes at least one of temperature data and acoustic data.

20. The non-transitory computer-readable storage medium of claim 15, wherein the execution of the instructions by the one or more processors cause the one or more processors to:

perform a number of the iterative adjustments to reduce a misfit between measured and simulated temperature traces by adjusting production in the plurality of zones of the wellbore.

* * * * *